US007293261B1

(12) United States Patent
Anderson et al.

(10) Patent No.: US 7,293,261 B1
(45) Date of Patent: Nov. 6, 2007

(54) LANGUAGE-NEUTRAL REPRESENTATION OF SOFTWARE CODE ELEMENTS

(75) Inventors: Christopher L. Anderson, Issaquah, WA (US); David S. Ebbo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 690 days.

(21) Appl. No.: 09/842,527

(22) Filed: Apr. 25, 2001

(51) Int. Cl.
*G06F 9/45* (2006.01)
*G06F 9/44* (2006.01)

(52) U.S. Cl. .............. 717/136; 717/106; 717/104; 717/108; 717/116; 717/137

(58) Field of Classification Search .......... 717/114, 717/146, 113, 143, 157, 141, 136, 137, 100, 717/104, 106–108, 116, 118
See application file for complete search history.

(56) References Cited

U.S. PATENT DOCUMENTS

| | | | | |
|---|---|---|---|---|
| 5,428,792 | A * | 6/1995 | Conner et al. ............. | 717/143 |
| 5,557,253 | A * | 9/1996 | Hegemann et al. ........ | 340/321 |
| 5,826,256 | A * | 10/1998 | Devanbu .................... | 707/4 |
| 5,835,712 | A | 11/1998 | DuFresne | |
| 5,860,008 | A * | 1/1999 | Bradley .................... | 717/137 |
| 5,881,290 | A * | 3/1999 | Ansari et al. ............. | 717/136 |
| 5,943,674 | A * | 8/1999 | Schofield ................. | 707/104.1 |
| 5,946,484 | A * | 8/1999 | Brandes .................... | 717/136 |
| 6,044,217 | A * | 3/2000 | Brealey et al. ............ | 717/107 |
| 6,067,413 | A * | 5/2000 | Gustafsson et al. ........ | 717/114 |
| 6,408,431 | B1 * | 6/2002 | Heughebaert et al. ..... | 717/106 |
| 6,457,172 | B1 * | 9/2002 | Carmichael et al. ....... | 717/141 |
| 6,480,867 | B1 * | 11/2002 | Kwan ....................... | 715/536 |
| 6,484,313 | B1 * | 11/2002 | Trowbridge et al. ....... | 717/146 |
| 6,560,774 | B1 * | 5/2003 | Gordon et al. ............. | 717/146 |
| 6,662,356 | B1 * | 12/2003 | Edwards et al. ........... | 717/113 |
| 6,738,967 | B1 * | 5/2004 | Radigan .................... | 717/146 |
| 6,738,968 | B1 * | 5/2004 | Bosworth et al. .......... | 717/157 |
| 6,748,588 | B1 * | 6/2004 | Fraser et al. .............. | 717/146 |
| 6,836,883 | B1 * | 12/2004 | Abrams et al. ............ | 717/140 |
| 6,931,623 | B2 * | 8/2005 | Vermeire et al. .......... | 717/108 |

FOREIGN PATENT DOCUMENTS

GB 1367741 A * 9/1974

OTHER PUBLICATIONS

Mason, A Functional Intermediate Form for Diverse Source Languages, ACM, Nov. 1996.*

(Continued)

*Primary Examiner*—Meng-Al T. An
*Assistant Examiner*—Insun Kang
(74) *Attorney, Agent, or Firm*—Amin, Turocy & Calvin, LLP

(57) ABSTRACT

A language-neutral model is employed to represent a compile unit to facilitate transformation of a representation of the compile unit to one or more other languages or to language implementations. The model provides a plurality of elements arranged according to a hierarchy in which each of the elements represents different programmatic constructs of a compile unit represented by the model. In one aspect, a code generator interface may be employed to facilitate generation of a high-level language from the language-neutral representation. In another aspect, a code parser may be employed to generate from source code a language neutral representation according to the model. In yet another aspect, a compiler interface may be utilized to transform the language-neutral representation into a low-level language, such as an executable assembly or an intermediate language.

49 Claims, 8 Drawing Sheets

OTHER PUBLICATIONS

Homburg et al., An Object Model for Flexible Distributed Systems, Mar. 29, 1995.*

Dyer, "Java decompilers compared," Javaworld, Jul. 1997.*

Nolan, "Decompile Once, Run Anywhere," New. Architect, Sep. 1997.*

Hardwick, J. C., et al.; "Java as an Intermediate Language", *School of Computer Science,* Aug. 12, 1996. p. 1-17.

Carlos A. Varela, et al., Providing Data on the Web: From Examples to Programs, Second International WWW Conference, 1994, pp. 1-9, Chicago, Illinois, USA.

NCSA httpd, University of Illinois at Urbana-Champaign, 1994, 4 pages.

* cited by examiner

LANGUAGE-NEUTRAL REPRESENTATION OF SOFTWARE CODE ELEMENTS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention relates generally to computer programming and, more particularly, it relates to a language-neutral representation of software code elements and/or to its translation to other code representations.

BACKGROUND OF THE INVENTION

Computers operate under the control of a program consisting of coded, executable instructions. Typically, a program is first written as a textual representation of computer-executable instructions in a high-level language, such as BASIC, PASCAL, C, C++, C#, or the like, which are more readily understood by humans. A file containing a program in its high-level language form is known as source code. The high-level language statements of the source code are then translated or compiled into the coded instructions executable by the computer. Typically, a software program known as a compiler is used for this purpose. The compiled form of a program is generally known as object code.

Typically, the source code of a programming language is formed of program constructs organized in one or more program units, such as procedures, functions, blocks, modules, projects, packages and/or programs. These program units allow larger program tasks to be broken down into smaller units or groups of instructions. High-level languages generally have a precise syntax or grammar, which defines certain permitted structures for statements in the language and their meaning.

A compiler is a computer program that translates the source code, which is written in a high-level computer programming language that is easily understood by human beings, into another language, such as object code executable by a computer or an intermediate language that requires further compilation to be executable. Typically, a compiler includes several functional parts. For example, a conventional compiler may include a lexical analyzer that separates the source code into various lexical structures of the programming language, known as tokens, such as may include keywords, identifiers, operator symbols, punctuation, and the like.

A conventional compiler also includes a parser or syntactical analyzer, which takes as an input a grammar defining the language being compiled and performs a series of actions associated with the grammar. The parser builds a parse tree for the statements in the source program in accordance with the grammar productions and actions. For each statement in the input source program, the parser generates a parse tree of the source input in a recursive manner based on relevant productions and actions in the grammar. Parsers typically apply rules in either a "top-down" or a "bottom-up" manner to construct a parse tree. The parse tree is formed of nodes corresponding to one or more grammar productions. Generation of the parse tree allows the parser to determine whether the parts of the source program comply with the defined grammar of the language. The parser performs syntactical checking, but usually does not check the meaning (or the semantics) of the source program.

A conventional parser also may create a Name List table (also called a "symbol table") that keeps track of information concerning each identifier declared or defined in the source program. This information includes the name and type of each identifier, its class (variable, constant, procedure, etc.), nesting level of the block where declared, and other information more specific to the class.

After the source program is parsed, it is input to a semantic analyzer, which checks for semantic errors, such as the mismatching of types, etc. The semantic analyzer accesses the Name List table to perform semantic checking involving identifiers. After semantic checking, the compiler generates intermediate code, optimizes the intermediate code, and then generates a target program (e.g., object code).

SUMMARY

The present invention provides a transformable language-neutral representation of related software code elements, such as may form a compile unit. The language-neutral representation is transformable into another type of code representation, such as corresponding object code, byte code, and/or source code. For example, a code generator may implement an appropriate code generation interface to convert the language-neutral representation to a selected source code having a desired syntax. By way of further example, a compiler interface may be implemented by a compiler to translate the language-neutral representation into executable object code. Such interfaces expose methods or functions that facilitate the translation from the language-neutral representation into a desired form.

In accordance with another aspect of the present invention, a design system may be implemented to create a language-neutral representation of a compile unit according to user-selected functionality. For example, a user may employ the design system to create a document or page having associated functionality. The design system, in turn, employs an appropriate interface to translate the document or page into a corresponding language-neutral representation of a compile unit corresponding to the document or page.

In accordance with an aspect of the present invention, the language-neutral representation may correspond to a collection of one or more elements arranged as a hierarchy of elements. By way of illustration, the elements may be arranged in a tree structure in which a root element corresponds to the compile unit. One or more other child elements may branch from the root element and/or from other branch elements, wherein each child element is associated with its respective parent element(s) and other intervening elements linking it to the root element. The tree structure facilitates navigation and/or searching of the tree to locate a desired element. The branch elements may represent different types of programmatic constructs, such as, including namespaces, classes, statements, expressions, etc.

In accordance with one particular aspect, each of the elements in the language-neutral representation may be implemented as an object. Each object, for example, exposes methods, properties, and/or functions associated with the program elements represented by the object. An object-based representation facilitates manipulation and modification of objects. In addition, other objects may derive from one or more objects in the language-neutral representation.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

The present invention provides an object model to represent a compile unit, which facilitates transformation of a representation of a compile unit arranged according to the object model to one or more other languages or language implementations. The object model provides a hierarchy to characterize programmatic constructs of a compile unit. Accordingly, in one aspect, a code generator interface may be employed to facilitate generation of a high-level language, such as source code, from the language-neutral representation. In another aspect, a compiler interface may be utilized to transform the language-neutral representation into a low-level language, such as an executable assembly or an intermediate language.

Figure 1:
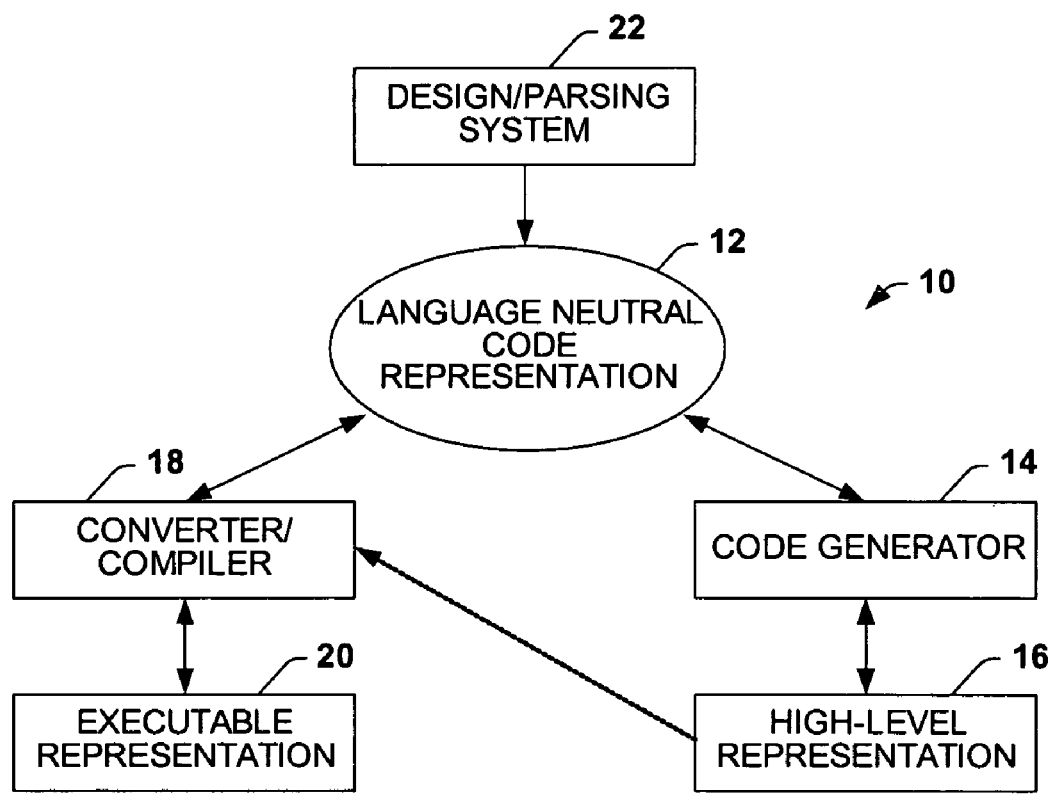
FIG. 1 is a block diagram illustrating a system in accordance with the present invention.

FIG. 1 illustrates a functional block diagram of a system 10 that includes a language-neutral representation of code 12 in accordance with an aspect of the present invention. The language-neutral representation 12 is an arrangement of program elements that form a compile unit.

As used herein, a compile unit is a sequence of one or more high-level language grammatical words or phrases that make a portion of a program complete enough to compile (e.g., a compilable unit of code implemented in any form).

Each high-level language has different rules for what constitutes a compile unit. For example, a type declaration of a class may be compilable as an empty class. In practice, however, there tend to be more than one programmatic construct in a compile unit. Thus, each program element of the language-neutral representation 12 represents a corresponding programmatic construct of the compile unit, which may include one or more lexical and/or syntactic constructs.

By way of example, the program elements of the language neutral representation 12 include objects instantiated to represent corresponding programmatic constructs of the compile unit. One or more objects, for example, are contained within a basic object corresponding to the compile unit. Typically, there is at least one object that represents a type declaration for a class within the compile unit. Similarly, the type class object may contain one or more member objects, such as a collection objects that represent statements and/or expressions. Type declaration objects further may be compartmentalized into one or more namespace objects. The language neutral representation 12 thus arranges associated objects according to a defined hierarchy.

The language neutral representation 12 facilitates transformation or conversion of the code represented by the programmatic elements into other target language implementations. By way of example, the target languages include high-level language implementations (e.g., C++, C#, JAVA, or other source code) and/or lower-level implementations (e.g., assembly, byte code). An object-based model, in accordance with the present invention, also facilitates manipulation, derivation, and/or modification of the respective objects.

A code generator 14 may be employed to transform the language neutral representation 12 into a corresponding high-level language representation (e.g., a textual, graphical, or symbolic representation) 16 in accordance with an aspect of the present invention. For example, the code generator 14 may utilize an interface (not shown) having associated interface components that enables the language neutral representation 12 to be converted into the desired high-level representation of the code 16. By way of example, the interface components may include respective components to generate code for namespace objects, class objects, expression objects, statement objects, etc, which may form the compile unit. Each language into which the language neutral representation 12 is to be converted implements the code generator interface so as to enable the language-neutral representation to be converted into the particular language.

A converter 18 also may be employed to transform the language neutral representation 12 into a corresponding low-level language, executable or intermediate language representation 20 in accordance with an aspect of the present invention. The converter 18, for example, employs a compiler interface that enables translation from the language neutral representation 12 to the executable representation, such as assembly (or object code), byte code, or a desired intermediate language. The compile interface returns results of a compilation process, such as may include corresponding object code, an indication of any errors association with the compilation process, and/or a pointer or filename to the created assembly.

By way of further illustration, the converter 18 may include a language-specific compiler that implements an appropriate compiler interface to enable appropriate translation from the language neutral representation 12 to the executable representation 20. In particular, the compiler may implement an interface similar to the code generator 14 to convert the language neutral representation 12 into a desired language-specific representation 16. The converter 18 may then perform a conventional compilation to convert high-level representation 16 into the corresponding low-level code representation 20, such as assembly, byte code or an intermediate language.

In accordance with a particular aspect of the present invention, the language-neutral representation may be created by a design or parsing system 22. The system 22, for example, creates the representation 12 by converting programmatic constructs of code into corresponding objects of the language-neutral representation 12. Each object of the representation 12, for example, is an instance of a corresponding class of a plurality of available classes and is arranged based on a defined hierarchy for the classes. For the example of a parsing system 22, the representation 12 may be converted from source code. Alternatively or additionally, the representation 12 may be created based on computer-executable instructions graphically created via an associated user interface of a design system. By way of example, a specific language (e.g., source code) may be parsed into distinct programmatic constructs that are, in turn, mapped to corresponding language-neutral classes. The language-neutral classes are instantiated, for example, to create language-neutral objects representing the respective programmatic constructs, which objects may be arranged according to an associated hierarchal relationship. Those skilled in the art will understand and appreciate other ways in which a language-neutral, object-based representation may be created in accordance with an aspect of the present invention based on the teachings contained herein.

Figure 2:
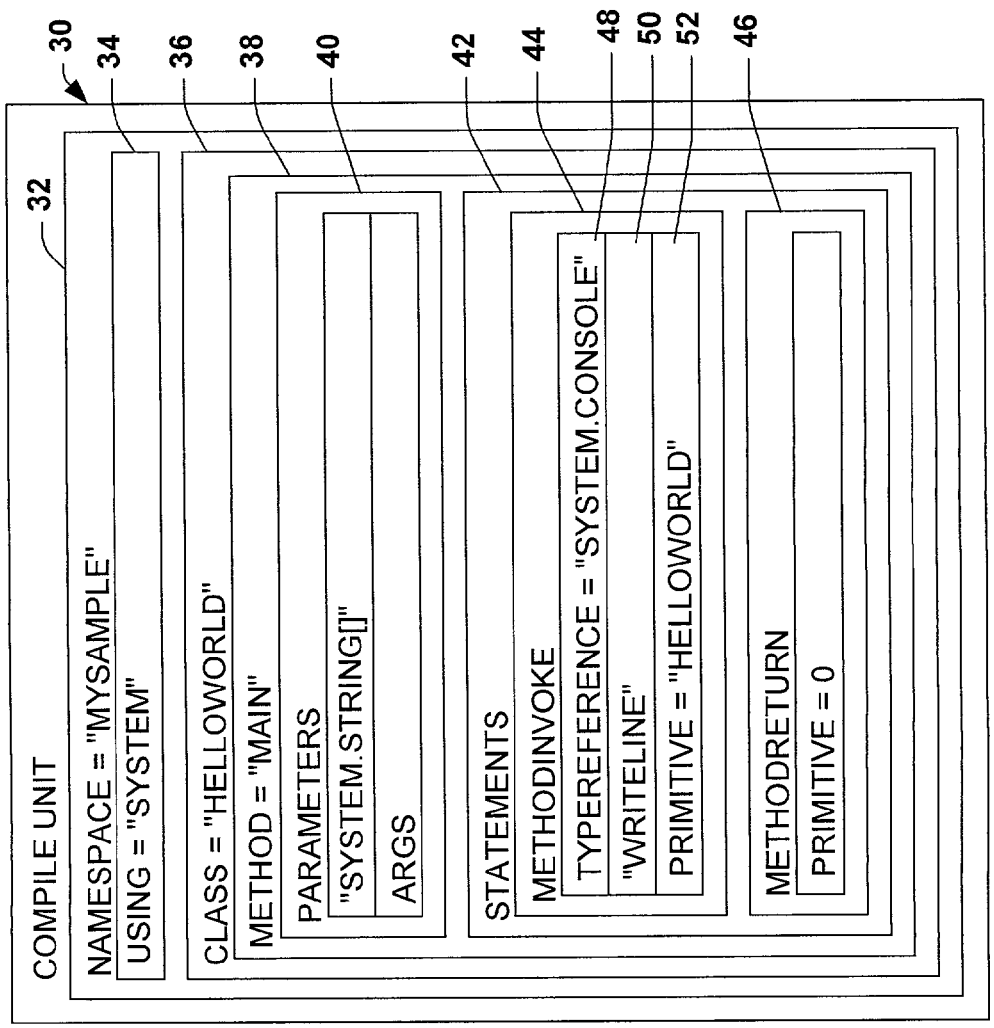
FIG. 2 depicts an example of an object model constructed in accordance with the present invention.

FIG. 2 illustrates an example of a language-neutral, object-based representation 30 of a compile unit for the following C# code:

```
namespace MySample {
using System;
public class HelloWorld {
    public static int Main(string[ ] args) {
        Console.WriteLine("Hello World");
        return 0;
    }
}
}
```

The language-neutral representation 30 includes a plurality of objects arranged according to an established hierarchy in accordance with an aspect of the present invention. Each object corresponds to an instance of a respective class of the object model.

The representation 30 itself is an instance of a compile unit class, which is the top level of object in the hierarchy. The compile unit 30, for example, may be implemented an instance of the following class:

```
public class CodeCompileUnit {
  public NamespaceCollection Namespaces { get; }
  public CodeAttributeDeclarationCollection AssemblyCustomAttributes
     { get; }
}
```

All other programmatic elements are represented as corresponding objects within the compile unit object 30.

For example, a namespace class object 32 is employed to represent the namespace MYSAMPLE. The namespace object could correspond to an instance of the following class:

```
public class CodeNamespace: CodeObject {
    public CodeTypeDeclarationCollection Classes { get; }
    public CodeNamespaceImportCollection Imports { get; }
    public string Name { get; set; }
    public CodeCommentStatementCollection Comments { get; set; }
}
```

The namespace object 32 contains the other objects, also according to the established hierarchy. In particular, an object 34 provides an object reference to classes within a SYSTEM namespace and another object 36 corresponds to a type declaration for the class HELLOWORLD. An example of a class that may be instantiated to define the objects 34 and 36 is the following CodeTypeDeclaration class.

```
public class CodeTypeDeclaration: CodeTypeMember {
    public TypeAttributes TypeAttributes { get; set; }
    public CodeTypeDeclarationReferenceCollection BaseTypes { get; }
    public CodeTypeMemberCollection Members { get; }
    public event EventHandler PopulateBaseTypes;
    public event EventHandler PopulateMembers;
}
```

In this example, CodeTypeDeclaration derives from CodeTypeMember. Thus, it is to be appreciated that one class may be nested within another class in a similar manner.

An object 38 represents the static MAIN function, which is a member of the class HELLOWORLD. An object 40 also is provided for parameters of the MAIN function. The parameter object 40 further includes attributes and properties, namely, the SYSTEM.STRING array and arguments ARGS. The objects 38 and 40, for example, could be implemented as an instance of a CodeMemberMethod class as follows:

```
public class CodeTypeConstructor: CodeMemberMethod {
}
```

In this example, the STATIC and INT are represented as attributes of the CodeMemberMethod class called MAIN.

The method object 38 includes a statement object 42, such as an instance of a class type called CodeExpressionStatement. An example of the CodeExpressionStatement class is:

```
public class CodeExpressionStatement: CodeStatement {
    public CodeExpressionStatement(CodeExpression expression)
    public CodeExpression Expression { get; set; }
}
```

This class, which contains a reference to members of a CodeStatement class, is operative to convert an expression into a statement. The object 42 is organized as a member of the MAIN object 38. The statement object 42 further includes a pair of associated objects 44 and 46. The object 44 corresponds to an instance of a CodeMethodReference- Expression class, which encapsulates a method invocation expression. An example of the CodeMethodReferenceExpression class is

```
public class CodeMethodReferenceExpression: CodeObject {
    public CodeMethodReferenceExpression Method { get; set; }
    public CodeExpressionCollection Parameters { get; }
}
```

The expression encapsulated in the object 44 further includes attribute objects 48, 50 and 52, which declares a parameter in the parameter list of a method, property, or constructor. For example, the object 48 represents an instance of a CodeParameterDeclaration class of type SYSTEM.CONSOLE, such as

```
public class CodeParameterDeclarationExpression: CodeObject {
    public CodeAttributeDeclarationCollection CustomAttributes { get; set; }
    public FieldDirection Direction { get; set; }
    public CodeTypeReference Type { get; set; }
    public string Name { get; set; }
}
```

A WRITELINE object 50 is the name of the method being invoked and the object 52 represents an instance of a CodePrimitiveExpression class that contains the primitive value "HELLOWORLD". The value may be any type defined in the root namespace (e.g., String, Int32, etc.). An example of the CodePrimitiveExpression class is

```
public class CodePrimitiveExpression: CodeExpression {
    public object Value { get; set; }
}
```

Figure 3:
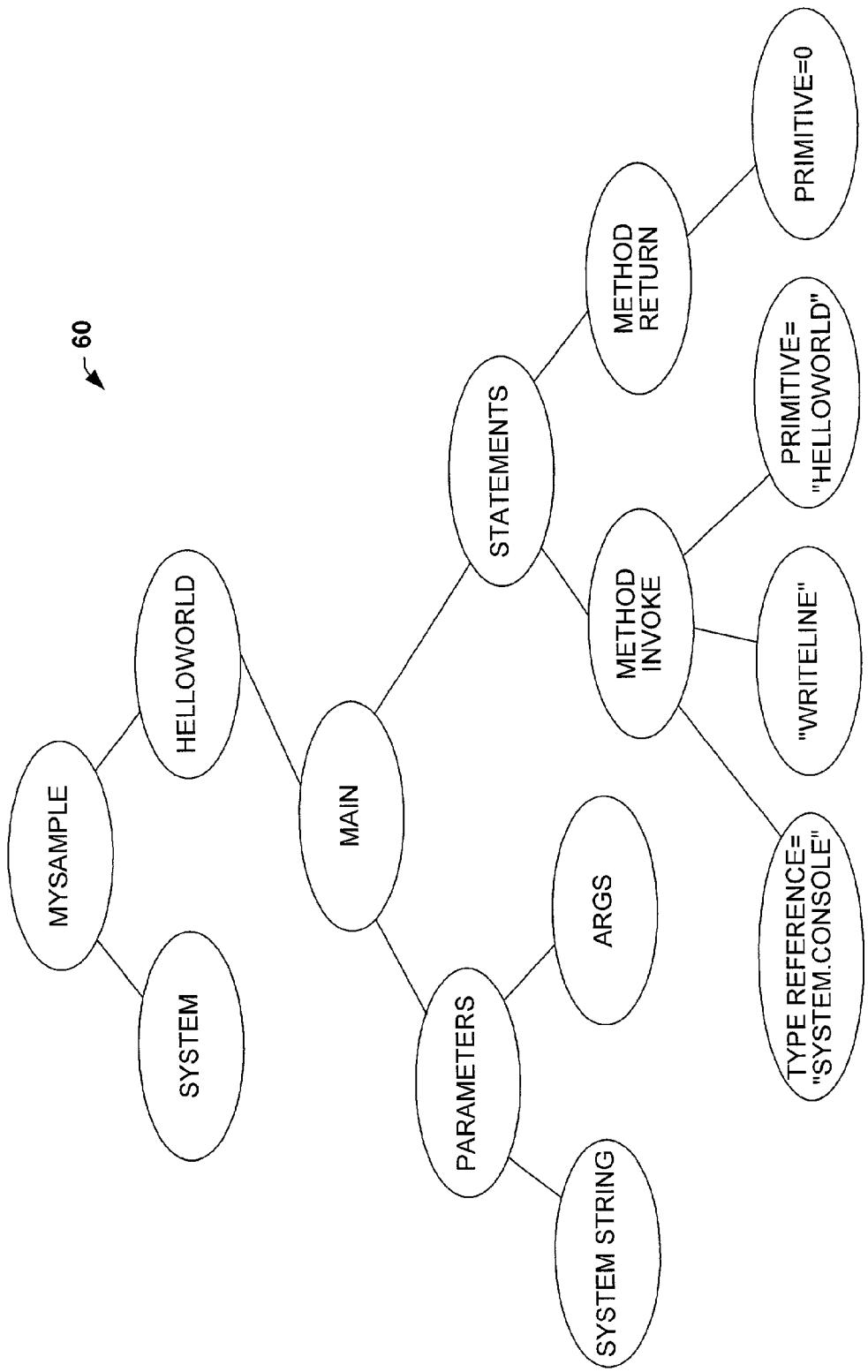
FIG. 3 depicts another example of an object model constructed in accordance with the present invention.

FIG. 3 is another example of a language-neutral representation of a compile unit 60 for the same piece C# code identified above in accordance with an aspect of the present invention. Briefly stated, the compile unit is represented as a graph that includes nodes and connections between associated nodes. The nodes represent individual objects of code (e.g., instances of corresponding classes), with the connections corresponding to the hierarchal association between objects. Because the objects 30-52 were described above with respect to FIG. 2, a discussion of the objects has been omitted for purposes of brevity.

Because, in accordance with an aspect of the present invention, objects are instances of corresponding classes, a user can manipulate and modify objects of the language-neutral representation. After a user has built up a tree of objects, such as shown in FIGS. 2 and 3, the user may obtain an appropriate interface (a code generator interface and/or a code compiler interface) to transform the language neutral representation to a desired form according to the user's final goal.

In view of the foregoing example, it will be appreciated that, in accordance with an aspect of the present invention, each object within an object-based representation of a compile unit object 12, 30 or 60 (FIG. 1, 2 or 3, respectively) may be implemented as an instance of an associated class. Examples of classes for some common types of program elements and their hierarchal relationships will be better appreciated with reference to a subsection of the Detailed Description called "Examples of Class Definitions."

Figure 4:
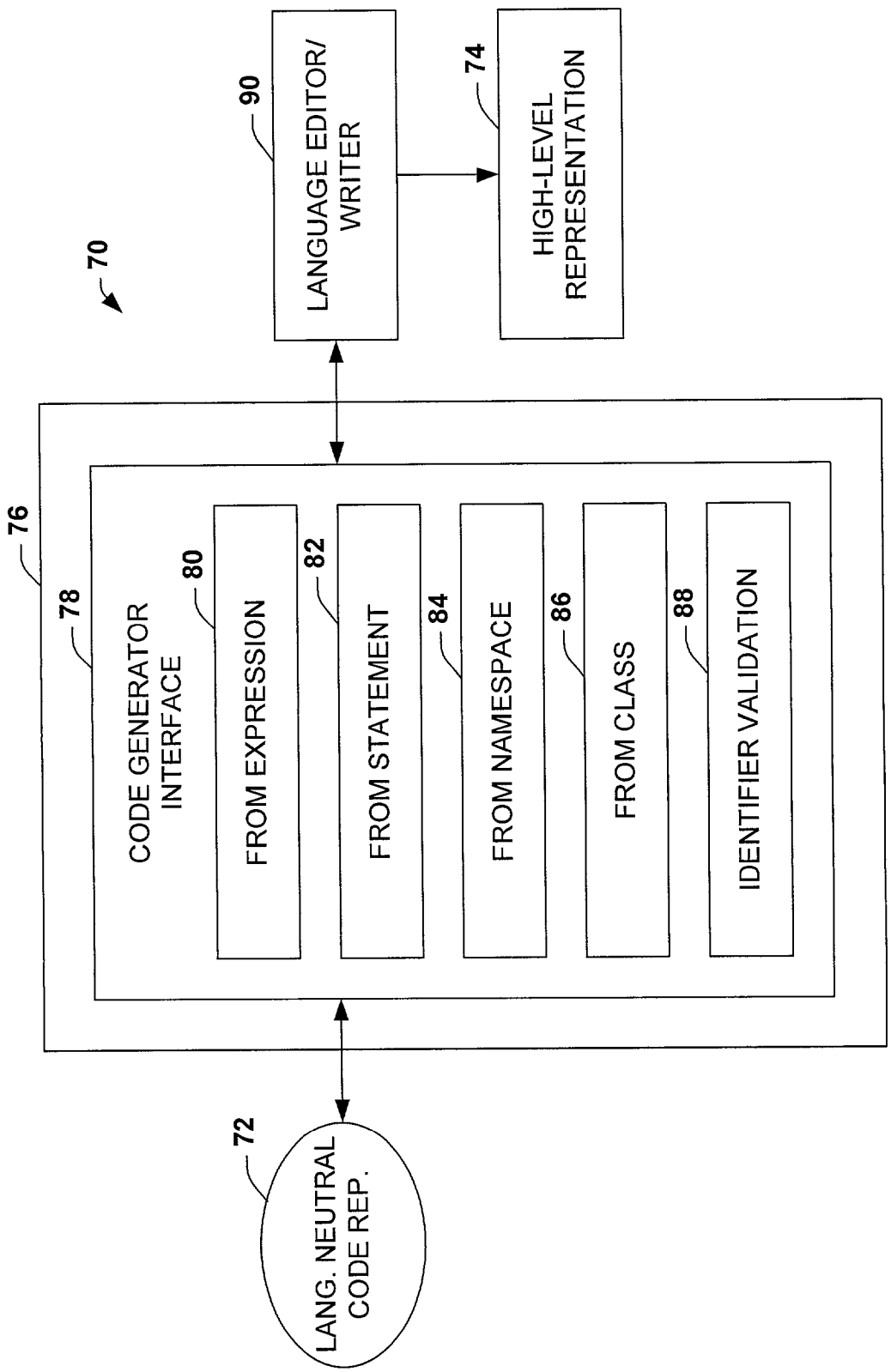
FIG. 4 is a functional block diagram of a system for translating a language-neutral representation to another form in accordance with the present invention.

In accordance with an aspect of the present invention, FIG. 4 illustrates a functional block diagram of a system 70 operable to convert code from a language-neutral representation 72 of the code to a language-specific representation of the code 74. The system 70 includes a code generator 76 that implements a code generator interface 78. The interface 78 provides a basic interface for generating the representation 74, such as a desired high-level language or source code.

The code generator interface 78, for example, includes a plurality of methods 80, 82, 84, and 86 that are operative to convert different types of program elements from the representation 72 to a corresponding representation (e.g., textual, graphical, symbolic, etc.) 74 in a specific language. In particular, the interface component 80 provides an interface for converting an instance of an expression class object to its corresponding representation. Similarly, the methods 82, 84, and 86 provide interfaces for converting respectively from a statement class object, a namespace class object and a type declaration class object to their corresponding high-level representation. The code generation interface 78 further may include one or more identifier validation methods 88 that are operative to validate different class identifiers provided in the language-neutral representation 72. If a valid identifier does not exist, the validation method 88 may create a valid identifier that may be described in the representation 74 being created.

The code generator interface 78 generates corresponding code and provides the code to an associated language editor/writer 90, such as by a method call to the editor/writer. The code generator interface 78 may be implemented for each language into which the language-neutral representation 72 is to be transformed. The editor/writer 90 returns the corresponding high-level representation 74 of source code, such as may be displayed on an associated video display.

An example of a code generator interface named ICode-Generator, such as may correspond to the interface 78, follows:

```
public interface ICodeGenerator {
    void GenerateCodeFromExpression(CodeExpression e, TextWriter w, CodeGeneratorOptions o);
    void GenerateCodeFromStatement(CodeStatement e, TextWriter w, CodeGeneratorOptions o);
    void GenerateCodeFromNamespace(CodeNamespace e, TextWriter w, CodeGeneratorOptions o);
    void GenerateCodeFromClass(CodeTypeDeclaration e, TextWriter w, CodeGeneratorOptions o);
    bool IsValidIdentifier(string value);
    void ValidateIdentifier(string value);
    string CreateEscapedIdentifier(string value);
    string CreateValidIdentifier(string value);
```

```
    string GetTypeOutput(CodeTypeReference type);
    bool Supports(GeneratorSupport supports);
}
```

Formatting options also may be implemented in connection with the code generator interface 78 to provide selected levels of tabbing or spacing for the different lines of code. The format options, for example, may correspond with the hierarchy of the program elements associated with the language-neutral representation 72. An example of formatting options may be implemented as an instance of a CodeGeneratorOptions class, as follows:

```
public class CodeGeneratorOptions {
    public CodeGeneratorOptions( );
    public object this[string index] { get; set; }
```

-continued

```
    public string IndentString { get; set; } // default 4 spaces. Can also be
single tab.
    public string BracingStyle { get; set; } // default "Block", can also be
"C"
    public bool ElseOnClosing { get; set; } // default false
    public bool BlankLinesBetweenMembers { get; set; } // default true
}
```

Figure 5:
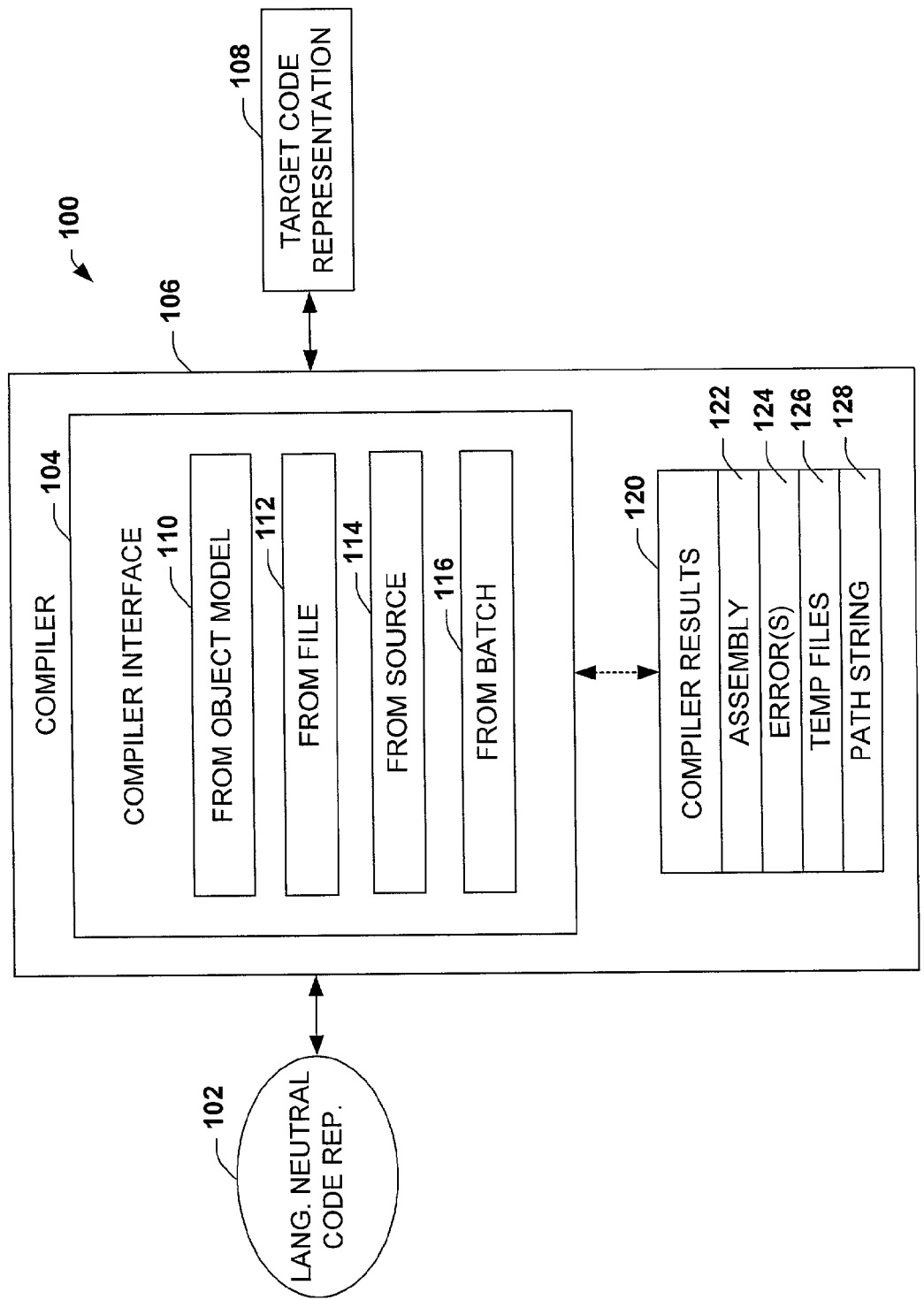
FIG. 5 is a functional block diagram of a system for translating a language-neutral representation to another form in accordance with the present invention.

FIG. 5 illustrates an example of a system 100 that may be utilized to compile a language-neutral, object-based representation of a compile unit 102 in accordance with an aspect of the present invention. The system 100 includes a compiler interface 104, which may be implemented in a compiler 106, to compile from one or more different implementations of code including the language-neutral representation 102 to a desired target code representation 108, such as assembly, byte code, or an intermediate language representation.

The compiler interface 104 includes one or more interface components for implementing various modes of compiling. By way of example, the compiler interface 104 may include a FROM OBJECT MODEL interface component 110 for compiling from an object-based representation of code, a FROM FILE interface component 112 for compiling from a file, a FROM SOURCE interface component 114 for compiling from a source code representation, and a FROM BATCH interface component 116 for compiling in a batch mode. Each component 110, 112, 114, 116 utilizes a collection of methods and/or parameters to control the compilation. For example, the compiler components 110-116 may instantiate one or more selected classes to output the target code 108 and to identify the compilation unit.

An example of a compiler interface that may be utilized in accordance with an aspect of the present invention is described below as ICodeCompiler:

```
    public interface ICodeCompiler {
        CompilerResults[ ] CompileAssemblyFromDom(CompilerParameters options,
CodeCompileUnit[ ] compilationUnits);
        CompilerResults[ ] CompileAssemblyFromFile(CompilerParameters options, string [ ]
fileNames);
        CompilerResults[ ] CompileAssemblyFromSource(CompilerParameters options, string
source);
        CompilerResults CompileAssemblyFromDom(CompilerParameters options,
CodeCompileUnit compilationUnit);
        CompilerResults CompileAssemblyFromFile(CompilerParameters options, string
fileName);
        CompilerResults CompileAssemblyFromSource(CompilerParameters options,
string source);
        CompilerResults CompileAssemblyFromDomBatch(CompilerParameters options,
CodeCompileUnit[ ] compilationUnits);
        CompilerResults CompileAssemblyFromFileBatch(CompilerParameters options,
string [ ] fileNames);
        CompilerResults CompileAssemblyFromSourceBatch(CompilerParameters options,
string [ ] sources);
    }
```

After compilation is complete, an instance of a compiler results class 120 may be created for the compiled code. The instance of the compiler results 120 includes class members that characterize different aspects of the resulting compilation process. For example, the compiler results 120 may include a compiled assembly 122 itself (or other target code representation 108) and a collection of errors and/or warnings 124 generated during the compilation process. The compiler results 120 also may include a temporary files member 126 that tracks and disposes of temporary files created before and during compilation. The compiler results 120 may also contain an identifier (e.g., a string) 128 indicative of a directory path for the compiled code 108.

An example of a CompilerResults class that may be employed to create an instance of the compiler results according to an aspect of the present invention is:

```
    public class CompilerResults {
        public Assembly CompiledAssembly { get; set; }
        public CompilerErrorCollection Errors { get; }
        public StringCollection Output { get; }
```

-continued

```
        public TempFiles TempFiles { get; set; }
        public string PathToAssembly { get; set; }
        public int NativeCompilerReturnValue { get; set; }
    }
```

Similarly, examples of classes for the compiler parameters (CompilerParameters), such as may be used to control the output of the compilation, and a simple class for collecting compilation errors (CompilerErrorCollection) are respectively:

```
public class CompilerParameters {
    public bool GenerateExecutable { get; set; }
    public bool GenerateInMemory { get; set; }
    public TempFiles TempFiles { get; set; }
    public StringCollection ReferencedAssemblies { get; }
    public string OutputAssembly { get; set; }
    public string TemporaryFilesDir { get; set; }
    public bool IncludeDebugInformation { get; set; }
}
public class CompilerErrorCollection: CollectionBase {
    public CompilerErrorCollection( ) { }
    public CompilerErrorCollection(CompilerErrorCollection value) { }
    public CompilerErrorCollection(CompilerError[ ] value) { }
    public CompilerError this[int index] { }
    public int Add(CompilerError value) { }
    public void AddRange(CompilerError[ ] value) { }
    public void AddRange(CompilerErrorCollection value) { }
    public bool Contains(CompilerError value) { }
    public void CopyTo(CompilerError[ ] array, int index) { }
    public bool HasErrors { get; }
    public bool HasWarnings { get; }
    public int IndexOf(CompilerError value) { }
    public void Insert(int index, CompilerError value) { }
    public void Remove(CompilerError value) { }
}
```

Figure 6:
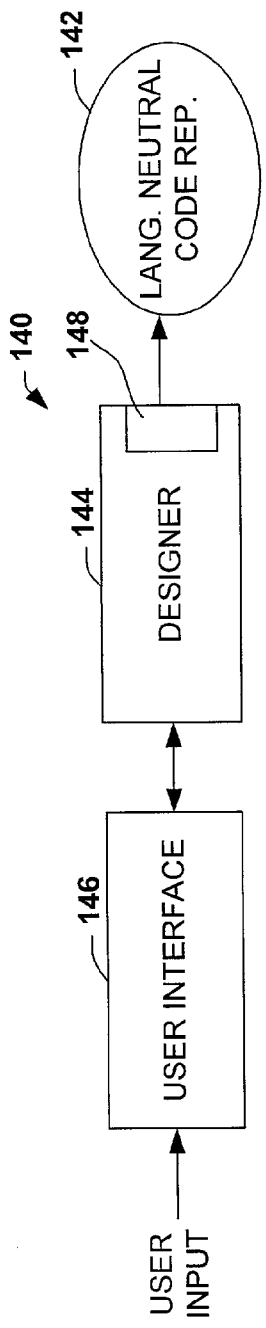
FIG. 6 is an example of a system that may be employed to generate a language-neutral representation in accordance with the present invention.

FIG. 6 illustrates an example of a system 140 that may be employed to create a language-neutral representation of code 142 in accordance with an aspect of the present invention. The system 140 includes a designer or design tool 144 and a user interface (e.g., a graphical user interface) 146 associated with the designer. The user interface 146 receives user inputs, such as associated with the design of one or more programmatic components. By way of example, the user interface 146 may provide a graphical foundation to facilitate creating a form, such as an XML, HTML, or XSL page for the Internet. A user thus may employ the user interface 146 to create methods, add properties, and otherwise define and/or modify attributes of a form or other type of program. Those skilled in the art will understand and appreciate other types of design tools that may be employed, in accordance with the present invention, to facilitate creation of code.

The designer 144 includes an interface 148 programmed, in accordance with an aspect of the present invention, to help generate the language-neutral, object-based representation 142 of a compile unit. The interface 148, for example, may provide a dictionary or library of class definitions for available types of program elements that may be arranged to form a compile unit, in accordance with an aspect of the present invention. The designer 144 employs the interface 148 to create program elements as objects (e.g., instances of the defined classes) based on user inputs received by the user interface 146. As described herein, the objects are arranged according to a defined hierarchy so as to facilitate manipulation and modification of the objects generated by the designer 144. The resulting language-neutral representation 142 may be displayed or be converted to a desired form, such as shown and described herein.

Figure 7:
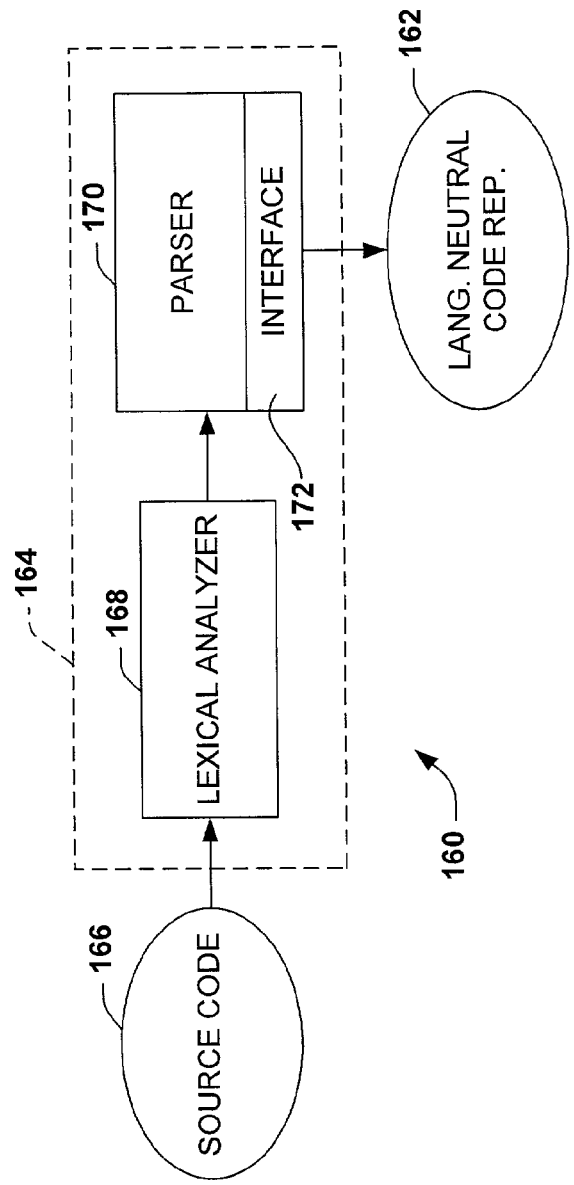
FIG. 7 is an example of another system that may be employed to generate a language-neutral representation in accordance with the present invention.

FIG. 7 illustrates an example of another system 160 that may be employed to generate a language-neutral representation of code 162 of a compile unit in accordance with an aspect of the present invention. In this example, the system includes a converter 164 that is programmed to convert a high-level representation of a programming language (e.g., source code) 166 to the desired language-neutral representation 162.

By way of example, the converter 164 includes a lexical analyzer 168 that recognizes strings of symbols (e.g., lexical structures) provided in the source code 166 to be converted. The lexical structures may include keywords, identifiers, operator symbols, punctuation, and the like. The lexical analyzer provides the lexical structures to a parser 170.

The parser 170, in turn, constructs a parse tree according to a grammar associated with the source code 166. According to an aspect of the present invention, the parse tree is created as a language-neutral code representation 162. In particular, the parser 170 employs a parser interface 172 that enables selected combinations of lexical structures to be selectively represented as objects. The interface 172, for example, contains class definitions for a plurality of different classes that represent corresponding programmatic elements. The parser 170 thus employs the interface 172 to create instances of classes corresponding to programmatic constructs, such as derived from the source code 166. Each instance of a class in the language-neutral representation of the parse tree 162 exposes methods, attributes and/or properties to facilitate converting the language-neutral representation into other types of code representations, such as to a high-level language (e.g., source code, such as C++, JAVA, ADA, C#, etc.) or to a low level language (e.g., assembly, byte code, etc.). The objects are arranged in a hierarchal relationship based on the class to which each object belongs.

It is to be appreciated that, given a programming language, a grammar can be constructed that can be parsed relatively quickly. For example, the parser 170 may employ linear algorithms to parse most types of languages, although other types of parsing algorithms could be used. The parser 170 further may apply rules in either a "top-down" or a "bottom-up" manner to construct a language-neutral representation of a parse tree 162. The interface 172 further may implement appropriate optimization into the language-neutral representation 162 to further facilitate its subsequent translation into another form.

In view of the foregoing, those skilled in the art will understand and appreciate various ways to utilize a language-neutral, object-based representation of a compile unit according to the present invention. Because the representation is language agnostic, it may be employed to provide a programmatic means for unifying programs written in different languages and across multiple platforms that, prior to the present invention, were not easily integrated. Moreover, the language-neutral model together with the interfaces and methods described herein provide an effective mechanism by which compiler and computer language vendors may utilize language agnostic code generation features and tools, such as may be available in platform-neutral and/or virtual operating environments.

Figure 8:
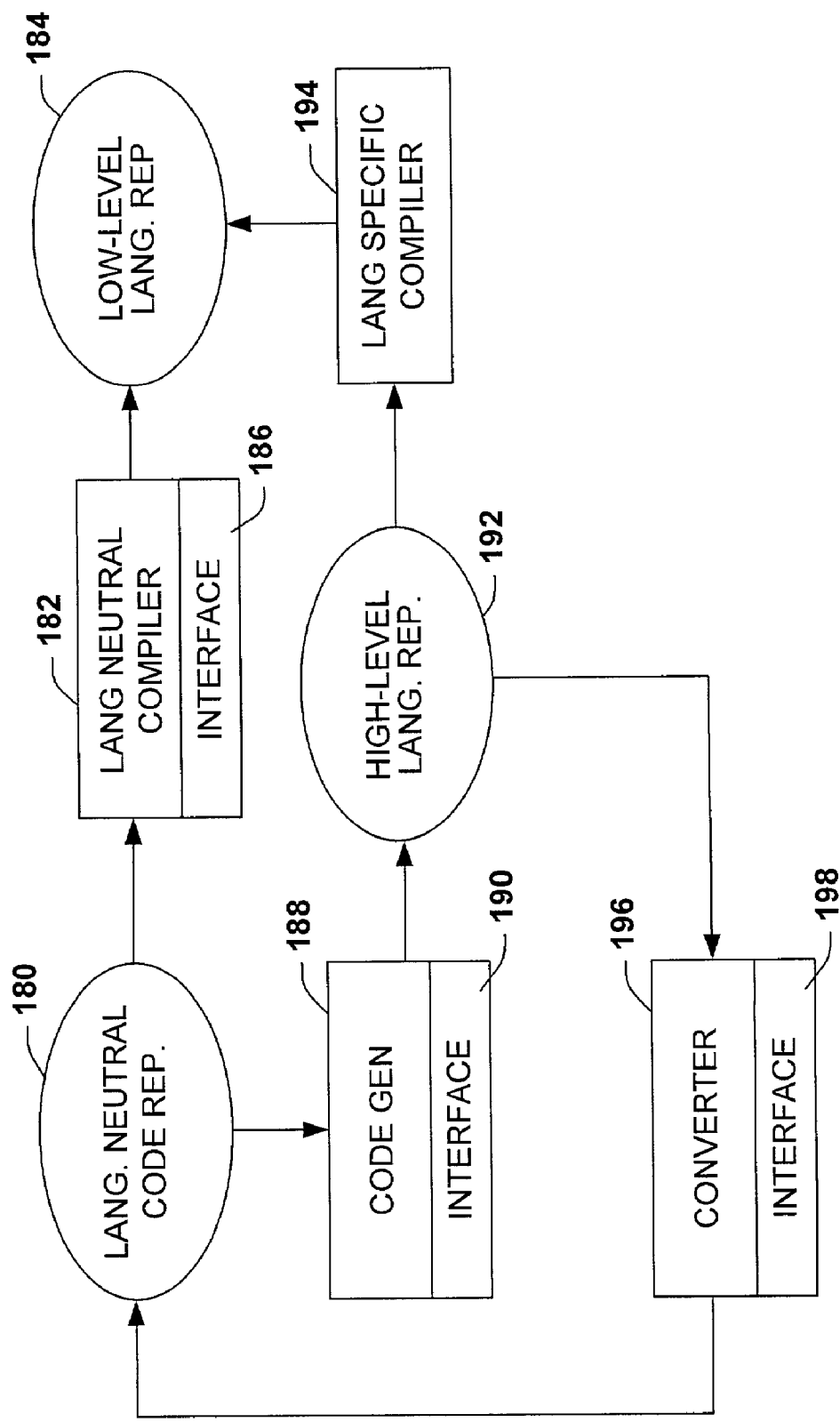
FIG. 8 illustrates a multi-scenario example that may be implemented relative a language-neutral representation in accordance with the present invention.

In view of the foregoing structural, functional, and graphical features described above, implementations in accordance with the present invention will be better appreciated with reference to FIG. 8. While, for purposes of simplicity of explanation, the methodology of FIG. 8 is shown and described as executing in a particular order, it is to be understood and appreciated that the present invention is not limited by such order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

FIG. 8 depicts multi-scenario example, illustrating several different ways in which a language-neutral representation of a compile unit 180 may be implemented in accordance with an aspect of the present invention. As mentioned above, the language-neutral representation 180 may be converted to one or more desired forms, such as to a desired high-level language (e.g., source code) and/or to a target low-level language (e.g., assembly, byte code, intermediate language).

By way of illustration, a language-neutral compiler 182 may operate to translate the language-neutral representation 180 into a desired low-level language representation 184. In accordance with an aspect of the present invention, the compiler implements a compiler interface 186, which is operative to enable translation of the language-neutral, object-based representation 180 to the low level language, such as shown and described with respect to FIG. 5.

By way of further illustration, a code generator 188 that implements a code generator interface 190, in accordance with an aspect of the present invention, may operate on the language-neutral representation 180 to generate a corresponding high-level language representation of the code 192 in a desired language. The code generator interface 190, for example, is programmed to expose methods, attributes and/or properties that operate on each object of the language-neutral representation 180, such as through associated identifiers for each object. The interface 190, in turn, enables the code generator 188 to extract corresponding programmatic elements and convert them to a high-level language representation 192, which may be presented as a corresponding textual, graphical or symbolic representation of a desired programming language.

The high-level language representation 192 may be viewed on an associated display, compiled, and/or converted into another language-neutral representation. For example, a compiler 194 specific to the high-level language representation 192 may be employed to translate the representation into its corresponding low-level language representation 184. Thus, by converting the language-neutral representation 180 into a desired language, the present invention enables virtually any compiler to be employed to compile code written in any language. Alternatively or additionally, a converter 196 implementing a parser interface 198 may convert the high-level language representation 192 into a language-neutral representation 180. It is to be appreciated that the language-neutral representation provided by the converter 196 might be different from the original language-neutral representation, as the particular arrangement and hierarchy of objects may vary based on the programming language from which it is generated. Those skilled in the art will understand and appreciate other code transformation scenarios that may be implemented in accordance with the present invention.

Figure 9:
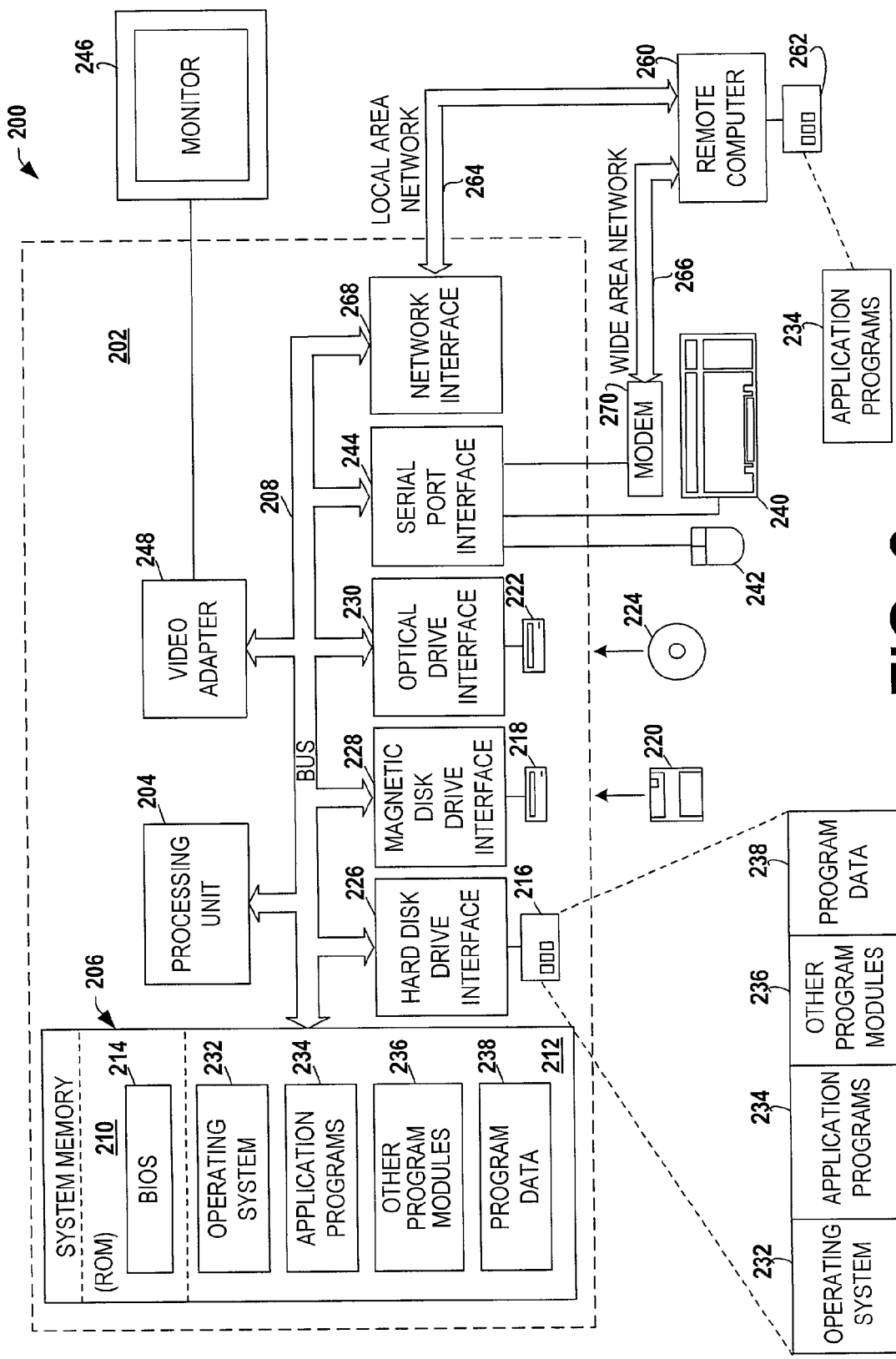
FIG. 9 is an example of an operating environment that may be used to implement a system or method in accordance with the present invention.

In order to provide additional context for the various aspects of the present invention, FIG. 9 and the following discussion are intended to provide a brief, general description of a suitable computing environment 200 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

With reference to FIG. 9, an exemplary system environment 200 for implementing the various aspects of the invention includes a conventional computer 202, including a processing unit 204, a system memory 206, and a system bus 208 that couples various system components including the system memory to the processing unit 204. The processing unit 204 may be any commercially available or proprietary processor. In addition, the processing unit may be implemented as multi-processor formed of more than one processor, such as may be connected in parallel.

The system bus 208 may be any of several types of bus structure including a memory bus or memory controller, a peripheral bus, and a local bus using any of a variety of conventional bus architectures such as PCI, VESA, Microchannel, ISA, and EISA, to name a few. The system memory 206 includes read only memory (ROM) 210 and random access memory (RAM) 212. A basic input/output system (BIOS) 214, containing the basic routines that help to transfer information between elements within the computer 202, such as during start-up, is stored in ROM 210.

The computer 202 also may include, for example, a hard disk drive 216, a magnetic disk drive 218, e.g., to read from or write to a removable disk 220, and an optical disk drive 222, e.g., for reading from or writing to a CD-ROM disk 224 or other optical media. The hard disk drive 216, magnetic disk drive 218, and optical disk drive 222 are connected to the system bus 208 by a hard disk drive interface 226, a magnetic disk drive interface 228, and an optical drive interface 230, respectively. The drives and their associated computer-readable media provide nonvolatile storage of data, data structures, computer-executable instructions, etc. for the computer 202. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 200, and further that any such media may contain computer-executable instructions for performing the methods of the present invention.

A number of program modules may be stored in the drives and RAM 212, including an operating system 232, one or more application programs 234, other program modules 236, and program data 238. The operating system 232 may be any suitable operating system or combination of operating systems.

A user may enter commands and information into the computer 202 through one or more user input devices, such as a keyboard 240 and a pointing device (e.g., a mouse 242). Other input devices (not shown) may include a microphone, a joystick, a game pad, a satellite dish, wireless remote, a scanner, or the like. These and other input devices are often connected to the processing unit 204 through a serial port interface 244 that is coupled to the system bus 208, but may be connected by other interfaces, such as a parallel port, a game port or a universal serial bus (USB). A monitor 246 or other type of display device is also connected to the system bus 208 via an interface, such as a video adapter 248. In addition to the monitor 246, the computer 202 may include other peripheral output devices (not shown), such as speakers, printers, etc.

The computer 202 may operate in a networked environment using logical connections to one or more remote computers 260. The remote computer 260 may be a workstation, a server computer, a router, a peer device or other common network node, and typically includes many or all of the elements described relative to the computer 202, although, for purposes of brevity, only a memory storage device 262 is illustrated in FIG. 9. The logical connections depicted in FIG. 9 may include a local area network (LAN) 264 and a wide area network (WAN) 266. Such networking environments are commonplace in offices, enterprise-wide computer networks, intranets and the Internet.

When used in a LAN networking environment, the computer 202 is connected to the local network 264 through a network interface or adapter 268. When used in a WAN networking environment, the computer 202 typically includes a modem 270, or is connected to a communications server on the LAN, or has other means for establishing communications over the WAN 266, such as the Internet. The modem 270, which may be internal or external, is connected to the system bus 208 via the serial port interface 244. In a networked environment, program modules (including application programs 36) depicted relative to the computer 202, or portions thereof, may be stored in the remote memory storage device 262. It will be appreciated that the network connections shown are exemplary and other means (e.g., wired or wireless) of establishing a communications link between the computers 202 and 260 may be used.

In accordance with the practices of persons skilled in the art of computer programming, the present invention has been described with reference to acts and symbolic representations of operations that are performed by a computer, such as the computer 202 or remote computer 260, unless otherwise indicated. Such acts and operations are sometimes referred to as being computer-executed. It will be appreciated that the acts and symbolically represented operations include the manipulation by the processing unit 204 of electrical signals representing data bits which causes a resulting transformation or reduction of the electrical signal representation, and the maintenance of data bits at memory locations in the memory system (including the system memory 206, hard drive 216, floppy disks 220, CD-ROM 224, and remote memory 262) to thereby reconfigure or otherwise alter the computer system's operation, as well as other processing of signals. The memory locations where such data bits are maintained are physical locations that have particular electrical, magnetic, or optical properties corresponding to the data bits.

Examples of Class Definitions

The following section provides a list of some examples of classes that may be implemented to provide a language-neutral representation of corresponding programmatic constructs of a compile unit in accordance with an aspect of the present invention. The following list is intended to be illustrative and not exhaustive, as those skilled in the art will understand and appreciate other classes that could be utilized as well as other ways in which such classes could be implemented.

For purposes of organization, each class is listed under a heading that corresponds to a class name. A brief description about a class is provided for some classes. An example of C# code that could be utilized to create an instance of the defined class also may be provided for certain classes. Those skilled in the art will understand and appreciate that other programming languages also could be employed to create instances of such classes, and that all such languages are contemplated as falling within the scope of the present invention.

CodeObject

```
public class CodeObject {
    public IDictionary UserData { get; }
}
```

The base class CodeObject is the main class for a language-neutral representation that holds state information that is necessary for code parses, etc.

CodeTypeReference

```
public sealed class CodeTypeReference: CodeObject {
    public CodeTypeDeclaration (string fullName) { ... }
    public CodeTypeDeclaration(Type type) { ... }
    public CodeTypeDeclaration(CodeTypReference arrayType, int rank)
    { ... }
    public CodeTypeReference ArrayElementType { get; set; }
    public int ArrayRank { get; set; }
    public string BaseType { get; set; }
}
```

CodeCatchClause : Object

```
C# Sample: catch (<Condition>) { <Statements> }
C# Sample: catch (<CatchExceptionType> <LocalName>) {
<Statements>}
public class CodeCatchClause {
    public CodeTypeReference CatchExceptionType { get; set; }
    public string LocalName { get; set; }
    public CodeStatementCollection Statements { get; }
}
```

The CodeCatchClause class is utilized by instances of the CodeTryCatchFinallyStatement. If the exception thrown inside a try clause is assignable to the type in condition, then the statements will be executed. The LocalName may be optional.

CodeComment : CodeObject

```
C# Sample: /* <Text> */
public class CodeComment: CodeObject {
    public bool DocComment { get; set; }
    public string Text { get; set; }
}
```

The CodeComment class inserts code so that it is not compiled. For example, the CodeGenerator is responsible for escaping out any characters in the text that would cause the comment to be incorrectly terminated. If DocComment is true, then the comment is encoded as a documentation comment, provided the language supports it.

CodeNamespaceImport : CodeObject

```
C# Sample: using <NameSpace>;
public class CodeNamespaceImport: CodeObject {
    public string NameSpace { get; set; }
}
```

The CodeNamespaceImport class is utilized to import a namespace into the current namespace. As a result, languages can chose to use the imported namespaces to shorten the type identifiers generated.

Expressions

This subsection provides examples of class definitions pertaining to programmatic expressions.

CodeExpression : CodeObject

CodeExpression is a base class for all expressions.

CodeArrayCreateExpression : CodeExpression

```
C# Sample: new <CreateType>[<Size>] { <Initializers> }
public class CodeArrayCreateExpression: CodeExpression {
    public CodeTypeReference CreateType { get; set; }
    public int Size { get; set; }
    public CodeExpressionCollection Initializers { get; }
    public CodeExpressionCollection SizeExpression { get; }
}
```

The CodeArrayCreateExpression, which derives from CodeExpression, is a class to create a new array, and initialize the members. If SizeExpression is null, then Size may be used to indicate the size of the array.

CodeBaseReferenceExpression : CodeExpression

```
C# Sample: base
public class CodeBaseReferenceExpression: CodeExpression {
}
```

The CodeBaseReferenceExpression class is used as a target of various other expressions. It is further used to differentiate a current instance from the base class. For example, when overriding a method, you may need to call the base class' implementation of that method.

CodeBinaryOperatorExpression : CodeExpression

```
C# Sample: <Left> <Operator> <Right>
public class CodeBinaryOperatorExpression: CodeExpression {
    public CodeExpression Left { get; set; }
    public CodeBinaryOperatorType Operator { get; set; }
    public CodeExpression Right { get; set; }
}
```

When implementing a CodeBinaryOperatorExpression, binary operators may or may not result in a value, and may or may not perform works. Examples of binary operator expressions are: Equality (=), addition (+) and bit-wise operators (|).

CodeCastExpression : CodeExpression

```
C# Sample: ((<TargetType>)(<Expression>))
public class CodeCastExpression: CodeExpression {
    public CodeExpression Expression { get; set; }
    public CodeTypeReference TargetType { get; set; }
}
```

The CodeCastExpression class casts an expression to a given type. Languages that support late binding, or have no type system, may ignore the cast portion of this expression, but should insert the expression.

CodeDelegateCreateExpression : CodeExpression

```
C# Sample: new <DelegateType>(<TargetObject>.
    <MethodName>)
public class CodeDelegateCreateExpression: CodeExpression {
public CodeTypeReference DelegateType { get; set; }
public CodeMethodReferenceExpression TargetObject { get; set; }
public string MethodName { get; set; }
}
```

The CodeDelegateCreateExpression class is employed to create a delegate of the specified type, which is bound to the given method on a target object.

CodeDelegateInvokeExpression : CodeExpression

```
C# Sample: <TargetObject>(<Parameters>)
public class CodeDelegateInvokeExpression: CodeExpression {
    public CodeExpressionCollection Parameters { get; }
    public CodeExpression TargetObject { get; set; }
}
```

The CodeDelegateInvokeExpression class is employed to invokes a delegate specified by a target object, given the parameters.

CodeDirectionExpression: CodeExpression

```
C# Sample: <Direction><Expression>
Swamp (ref i, ref j); //ref is the direction and i is the expression.
public class CodeDirectionExpression: CodeExpression {
public CodeDirectionExpression (FieldDirection direction,
CodeExpression expression)
public FieldDirection Direction { get; set; }
public CodeExpression Expression { get; set; }
}
```

By using a CodeExpression and one of the identifiers specified in FieldDirection, an instance of the CodeDirectionExpression class can be used to represent each parameter and the way it is passed. It is useful for expressions that indicate the nature of the reference are often used when passing parameters during method invokes.

CodeFieldReferenceExpression : CodeExpression

```
C# Sample: <TargetObject>.<FieldName>
public class CodeFieldReferenceExpression: CodeExpressions {
    public CodeExpression TargetObject { get; set; }
    public string FieldName { get; set; }
}
```

CodeArgumentReferenceExpression : CodeExpression

```
C# Sample: <ParameterName>
public class CodeArgumentReferenceExpression: CodeExpressions {
    public string ParameterName { get; set; }
}
```

CodeVariableReferenceExpression : CodeExpression

```
C# Sample: <VariableName>
public class CodeVariableReferenceExpression: CodeExpressions {
    public string VariableName { get; set; }
}
```

CodeIndexerExpression : CodeExpression

```
C# Sample: <TargetObject>[<Index>, <Index>]
public class CodeIndexerExpression: CodeExpression {
    public CodeExpression TargetObject { get; set; }
    public CodeExpressionCollection Indices { get; }
}
```

The CodeIndexerExpression is intended for use with code indexers (e.g., non-array).

CodeArrayIndexerExpression : CodeExpression

```
C# Sample: <TargetObject>[<Index>, <Index>]
public class CodeArrayIndexerExpression: CodeExpression {
    public CodeExpression TargetObject { get; set; }
    public CodeExpressionCollection Indices { get; }
}
```

The CodeArrayIndexerExpression class is intended for use with array (e.g., non-custom) indexers.

CodeSnippetExpression : CodeExpression

```
C# Sample: <Value>
public class CodeSnippetExpression: CodeExpression {
    public string Value { get; set; }
}
```

The CodeSnippetExpression class may be employed to embed a literal string into the code. It is noted that this is different than the CodePrimitiveExpression class, which is operative to embed a primitive value into the code. The value in this literal is inserted exactly into the code, while primitive converts the string, integer, or other data into the correct language representation of that value.

CodeMethodReferenceExpression : CodeExpression

```
C# Sample: <TargetObject>.<MethodName>
public class CodeMethodReferenceExpression: CodeObject {
    public CodeExpression TargetObject { get; set; }
    public string MethodName { get; set; }
}
```

The CodeMethodReferenceExpression class may be utilized to encapsulate a TargetObject and the actual arguments of the TargetObject.

CodeEventReferenceExpression : CodeExpression

```
C# Sample: <TargetObject>.<EventName>
public class CodeMethodReferenceExpression: CodeObject {
    public CodeExpression TargetObject { get; set; }
    public string EventName { get; set; }
}
```

CodeMethodInvokeExpression : CodeExpression

```
C# Sample: <MethodReference>(<Parameters>)
public class CodeMethodReferenceExpression: CodeObject {
    public CodeMethodReferenceExpression Method { get; set; }
    public CodeExpressionCollection Parameters { get; }
}
```

The CodeMethodInvokeExpression class is operative to encapsulates a method invocation expression.

CodeObjectCreateExpression : CodeExpression

```
C# Sample: new <CreateType>(<Parameters>)
public class CodeObjectCreateExpression: CodeExpression {
    public CodeTypeReference CreateType { get; set; }
    public CodeExpressionCollection Parameters { get; }
}
```

The CodeObjectCreateExpression class is operative to create a new instance of the specified type, given the parameters.

CodeParameterDeclarationExpression : CodeExpression

```
C# Sample: <CustomAttributes> <Direction> <Type> <Name>
public class CodeParameterDeclarationExpression: CodeObject {
    public CodeAttributeDeclarationCollection CustomAttributes { get; set; }
    public FieldDirection Direction { get; set; }
    public CodeTypeReference Type { get; set; }
    public string Name { get; set; }
}
```

The CodeParameterDeclarationExpression class is employed to declare a parameter in the parameter list of a method, property, or constructor. Direction may be used if the parameter needs to be passed by reference (e.g., "ref" and "out" in C#).

CodePrimitiveExpression : CodeExpression

---
C# Sample: <Value>
---
```
public class CodePrimitiveExpression : CodeExpression {
    public object Value { get; set; }
}
```
---

The CodePrimitiveExpression class references a value of some primitive value. The value may be any type defined in the root System namespace (e.g., a String, Int32, etc.).

CodePropertyReferenceExpression : CodeExpression

---
C# Sample: <TargetObject>.<PropertyName>
---
```
public class CodePropertyReferenceExpression : CodeExpression {
    public string PropertyName { get; set; }
    public CodeExpression TargetObject { get; set; }
}
```
The CodePropertyReferenceExpression class references a property on a target object.

---

CodePropertySetValueReferenceExpression : CodeExpression

---
C# Sample: this
---
```
public class CodePropertySetValueReferenceExpression:
CodeExpression {
}
```
---

The CodePropertySetValueReferenceExpression class references a value being assigned to the property (e.g., "value" in C# and Visual Basic).

CodeThisReferenceExpression : CodeExpression

---
C# Sample: this
---
```
public class CodeThisReferenceExpression : CodeExpression {
}
```
---

The CodeThisReferenceExpression class is employed to reference a current instance of the class that is being declared (e.g., "this" in C# and C++, "Me" in Visual Basic).

CodeTypeOfExpression CodeExpression

---
C# Sample: typeof(<Type>)
---
```
public class CodeTypeOfExpression : CodeExpression {
    public CodeTypeReference Type { get; set; }
}
```
---

The CodeTypeOfExpression class is utilized to reference the System.Type object for a specified type.

CodeTypeReferenceExpression : CodeExpression

---
C# Sample: <Type>
---
```
public class CodeTypeReferenceExpression : CodeExpression {
    public CodeTypeReference Type { get; set; }
}
```
---

The CodeTypeReferenceExpression class is employed to reference the specified type. This is different from the CodeTypeOfExpression class in that the CodeTypeReferenceExpression class refers to the type so as to allow access to static members of the type. In contrast, the CodeTypeOfExpression class provides access to the reflection type object for the type.

Statements

This subsection provides examples of class definitions pertaining to various types of programmatic statements.

CodeStatement : Object

---
```
public class CodeStatement : CodeObject{
    public CodeLinePragma LinePragma { get; set; }
}
```
---

The CodeStatement class is the base class for all statements. Because the present invention is particularly useful to generate code from some other representation (WSDL, ASPX, etc.), a LinePragma is associated with each statement. The LinePragma provides a method for compilers and debuggers to map error messages and line information back to the original source, such as to facilitate optimization during a compile. If a language does not support LinePragma functionality, then it is desirable for a code compiler interface to perform such mapping.

CodeAssignStatement : CodeStatement

---
C# Sample: <Left> = <Right>;
---
```
public class CodeAssignStatement : CodeStatement {
    public CodeExpression Left { get; set; }
    public CodeExpression Right { get; set; }
}
```
---

The CodeAssignStatement class assigns the expression on the right to the expression on the left.

CodeAttachEventStatement : CodeStatement

---
C# Sample: <EventReference> += <Expression>
---
```
public class CodeAttachEventStatement : CodeStatement {
    public CodeEventReference Event { get; set; }
    public CodeExpression Listener { get; set; }
}
```

The CodeAttachEventStatement class may be utilized to attach a listener to the referenced event.

CodeCommentStatement : CodeStatement

---
C# Sample: /* <Text> */

---
```
public class CodeCommentStatement : CodeStatment {
    public CodeComment Comment { get; set; }
}
```
---

The CodeCommentStatement class is operative to insert code in a fashion so that it is not be compiled.

CodeIterationStatement : CodeStatement

---
C# Sample: for (<InitStatement>; <ConditionExpression>; <IncrementStatement>) { <Statements> }

---
```
public class CodeIterationStatement : CodeStatement {
    public CodeStatement IncrementStatement { get; set; }
    public CodeStatement InitStatement { get; set; }
    public CodeStatementCollection Statements { get; set; }
    public CodeExpression ConditionExpression { get; set; }
}
```
---

CodeIterationStatement class implements an iteration flow control statement, such as associated with the FOR statements. The language can choose to implement this in any fashion. For example, consider this C# alternative implementation:

---
```
// for loop implementation, outer braces for scopeing only ...
{
    <InitStatement>
    loopTop:
    if (<TestExpression>) {
        <Statements>
        <IncrementStatement>
        goto loopTop;
    }
}
```
---

Provided that a language supports some form of branch and jump instruction, the FOR loop can be implemented.

CodeConditionStatement : CodeStatement

---
C# Sample: if (<Condition>) { <TrueStatements> } else { <FalseStatements> }

---
```
public class CodeConditionStatement : CodeStatement {
    public CodeExpression Condition { get; set; }
    public CodeStatementCollection FalseStatements { get; }
    public CodeStatementCollection TrueStatements { get; }
}
```
---

CodeConditionStatement class is utilized to implement a conditional flow control statement, such as an IF statement.

The particular implementation will vary according to the language.

CodeGotoStatement : CodeStatement

---
C# Sample: goto <Label>;

---
```
public class CodeGotoStatement : CodeStatement {
    public CodeLabel Label{ get; set; }
}
```
---

The CodeGotoStatement class is employed to transfer control to a statement that is marked by a label, such as by a goto statement CodeLabelStatement : CodeStatement ---
C# Sample: <Label>:

---
```
public class CodeLabelStatement : CodeStatement {
    public string Name{ get; set; }
    public CodeStatement Statement{ get; set; }
}
```
---

The CodeLabelStatement class is used to identify a named label to be used with an instance of the CodeGotoStatement class.

CodeSnippetStatement : CodeStatement

---
$C_\#$ Sample: <LiteralStatement>
```
public class CodeSnippetStatement: CodeStatement {
    public string Value {get; set;}
}
```
---

The CodeSnippetStatement class is employed to embed a literal string into code. This is different than CodePrimitiveExpression class, which embeds a primitive value into the code. The value associated with the CodeSnippetStatement class is inserted exactly into the code, whereas CodePrimitiveExpression correctly convert the string, integer, or other data into the correct language representation of that value.

CodeExpressionStatement : CodeStatement

---
$C_\#$ Sample: <Expression>;
```
public class CodeExpressionStatement: CodeStatement {
    public CodeExpressionStatement(CodeExpression expression)
    public CodeExpression Expression {get; set;}
}
```
---

The CodeExpressionStatement class may be utilized to convert any expression into a statement.

CodeMethodReturnStatement : CodeStatement

---
$C_\#$ Sample. return <Expression>;
```
public class CodeMethodReturnStatement: CodeStatement {
    public CodeExpression Expression {get; set;}
}
```
---

An instance of the CodeMethodReturnStatement class returns a value from inside of a method. In addition to setting the return value of the method, the class further may exit the method. For example, in Visual Basic this may be implemented as an Assign and then a Exit Function.

CodeRemoveEventStatement : CodeStatement

```
        C# Sample: <EventReference> -= <Expression>
public class CodeRemoveEventStatement: CodeStatement {
    public CodeEventReference Event {get; set;}
    public CodeExpression Listener {get; set;}
}
```

The CodeRemoveEventStatement class may be utilized to remove a listener to the event.

CodeThrowExceptionStatement : CodeStatement

```
        C# Sample: throw <ToThrow>;
public class CodeThrowExceptionStatement: CodeStatement {
    public CodeExpression ToThrow {get; set;}
}
```

The CodeThrowExceptionStatement throws an exception returned from ToThrow. Typically, ToThrow is implemented as a CodeObjectCreateExpression class that creates an object deriving from System.Exception.

CodeTryCatchFinallyStatement : CodeStatement

```
        C# Sample: try {<TryStatements>} <CatchClauses> finally {
<FinallyStatements>}
public class CodeTryCatchFinallyStatement: CodeStatement {
    public CodeCatchClauseCollection CatchClauses {get;}
    public CodeStatementCollection FinallyStatements {get;}
    public CodeStatementCollection TryStatements {get;}
}
```

The CodeTryCatchFinallyStatement class executes a set of statements. The statements in the finally clause are executed, independently of how the try block is exited. Typically, only one of the catch clauses will be executed. If an exception is thrown inside of the try block, the first catch clause that can process the exception is executed.

CodeVariableDeclarationStatement : CodeStatement

```
        C# Sample: <Type> <Name> = <InitExpression>;
public class CodeVariableDeclarationStatement: CodeStatement {
    public CodeExpression InitExpression {get; set;}
    public string Name {get; set;}
    public CodeTypeReference Type {get; set;}
}
```

The CodeVariableDeclarationStatement class is operative to declare a local variable and optionally initialize it. It is to be appreciated that languages can implement the initialization as a second statement.

CodeTypeMember : CodeStatement

```
public class CodeTypeMember: CodeObject {
    public CodeLinePragma LinePragma {get; set;}
    public CodeCommentStatementCollection Comments {get; set;}
    public MemberAttributes Attributes {get; set;}
    public string Name {get; set;}
```

```
    public CodeAttributeDeclarationCollection CustomAttributes
        {get; set;}
}
```

The CodeTypeMember class provides the base class for all members of a CodeStatement class.

Types, Namespaces, and CompileUnits

This section provides examples of classes relating to types, namespaces and compile units.

CodeTypeDeclaration : CodeTypeMember

```
        C# Sample: <CustomAttributes><Attributes>
            [class|struct|enum|delegate]
<Name> : <BaseTypes> {<Members>}
public class CodeTypeDeclaration: CodeTypeMember {
    public TypeAttributes TypeAttributes {get; set;}
    public CodeTypeDeclarationReferenceCollection BaseTypes {get;}
    public CodeTypeMemberCollection Members {get;}
    public event EventHandler PopulateBaseTypes;
    public event EventHandler PopulateMembers;
}
```

The CodeTypeDeclaration class is utilized to represents a class. A class can either be a normal reference class, a struct, enum, or interface. By way of illustration, Structs and Enums have no basetypes, while classes and interfaces may have any number of basetype interfaces. Classes can have one basetype that is another class. Because the CodeType-Declaration class derives from CodeTypeMember, nested classes also may be represented in this fashion.

CodeCompileUnit : CodeObject

```
public class CodeCompileUnit {
    public NamespaceCollection Namespaces {get;}
    public CodeAttributeDeclarationCollection
        AssemblyCustomAttributes {get;}
}
```

The CodeCompileUnit class provides a top level object in a hierarchy for compilation. CodeCompileUnit provides an object that can be directly compiled. Some languages may only support a single namespace that contains a single class in a compile unit.

CodeSnippetCompileUnit : CodeObject

```
public class CodeSnippetCompileUnit: CodeCompileUnit {
    public CodeSmppetCompileUnit(string value);
    public string Value {get; set;}
    public CodeLinePragma LinePragma {get; set;}
}
```

The CodeSnippetCompileUnit class represents a snippet block of code, which may be injected directly in the source without modification.

CodeNamespace : CodeObject

```
C# Sample: namespace <Name> {<Imports> <Classes>}
public class CodeNamespace: CodeObject {
    public CodeTypeDeclarationCollection Classes {get;}
    public CodeNamespaceImportCollection Imports {get;}
    public string Name {get; set;}
    public CodeCommentStatementCollection Comments {get; set;}
}
```

The CodeNamespace class may be used to represent a namespace, which may contain any number of classes.

CodeTypeConstructor : CodeMemberMethod

```
C# Sample: <CustomAttributes> static <containing classname>( ) {
<Statements> }
public class CodeTypeConstructor: CodeMemberMethod {
}
```

The CodeTypeConstructor class represents the class constructor (also called a static constructor) of the class. The class constructor is executed when the type is first loaded by the runtime.

CodeEntryPointMethod : CodeMemberMethod

```
C# Sample: <CustomAttributes> public static void Main( )
    {<Statements>}
public class CodeEntryPointMethod: CodeMemberMethod {
}
```

The CodeEntryPointMethod class is employed to represent the entry point to an executable.

CodeTypeDelegate : CodeTypeDeclaration

```
C# Sample: <CustomAttributes> <Attributes>
    <ReturnType> delegate
<Name>(<Parameters>);
public class CodeTypeDelegate: CodeTypeDeclaration {
    public CodeTypeReference ReturnType {get; set;}
    public CodeParameterDeclarationExpressionCollection Parameters
        {get;}
}
```

CodeTypeDelegate represents a class that is a delegate.

CodeConstructor : CodeMemberMethod

```
C# Sample:
    <CustomAttributes>
    <Attributes><containing classname>(<Parameters>):
        this(<ChainedConstructorArgs>) {
        <Statements>
    }
    -- or --
    <CustomAttributes>
    <Attributes><containing classname>(<Parameters>):
        base(<BaseContrustructorArgs>),
    {
        <Statements>
    }
```

-continued

```
public class CodeConstructor: CodeMemberMethod {
    public CodeExpressionCollection ChainedConstructorArgs { get; }
    public CodeExpressionCollection BaseConstructorArgs { get; }
}
```

The CodeConstructor class represents an instance constructor for a class. Chained constructor args may be used when one constructor directly calls another constructor. Base constructor args may be used to call a base type constructor.

CodeSnippetTypeMember : CodeTypeMember

```
C# Sample: <Value>
public class CodeSnippetTypeMember: CodeSnippetTypeMember {
    public string Value { get; set; }
}
```

The CodeSnippetTypeMember class is utilized to embed a literal string into the code. This is different than the CodePrimitiveExpression class, which embeds a primitive value into the code. The value in this literal is inserted exactly into the code, while CodePrimitiveExpression class correctly converts the string, integer, or other data into the correct language representation of that value.

CodeMemberEvent : CodeTypeMember

```
C# Sample:
    <CustomAttributes>
    <Attributes> <EventType> <Name> {
        get {<GetStatements>}
        set {<SetStatements>}
    }
public class CodeMemberEvent: CodeTypeMember {
    public CodeTypeReference EventType { get; set; }
    public CodeTypeReference PrivateImplementation { get; }
    public CodeTypeReferenceCollection CodeTypeReferenceCollection
        { get; }
}
```

The CodeMemberEvent class is utilized to represent a member event on a type.

CodeMemberField : CodeTypeMember

```
C# Sample: <CustomAttributes> <Attributes> <Type> <Name> =
<InitExpression>;
public class CodeMemberField: CodeTypeMember {
    public CodeTypeReference Type { get; set; }
    public CodeExpression InitExpression { get; set; }
}
```

The CodeMemberField class represents a member field on a type.

CodeMemberMethod : CodeTypeMember

```
C# Sample:
    <CustomAttributes>
    return: <ReturnTypeCustomAttributes>
    <Attributes> <ReturnType> <Name> (<Parameters>) {
        <Statements> }
public class CodeMemberMethod: CodeTypeMember {
    public CodeTypeReference ReturnType { get; set; }
```

```
                        -continued
    public CodeStatementCollection Statements { get; }
    public CodeParameterDeclarationExpressionCollectionParameters
        { get; }
    public CodeAttributeDeclarationCollection
        ReturnTypeCustomAttributes { get; set; }
    public CodeTypeReference PrivateImplementation { get; }
    public CodeTypeReferenceCollection CodeTypeReferenceCollection
        { get; }
    public event EventHandler PopulateParameters;
    public event EventHandler PopulateStatements;
    public event EventHandler PopulateImplementationTypes;
}
```

The CodeMemberMethod class is used to represent a member method on a type.

CodeMemberProperty : CodeTypeMember

```
C# Sample:
    <CustomAttributes>
    <Attributes> <Type> <Name>[<Parameters>] {
        get { <GetStatements> }
        set { <SetStatements> }
    }
public class CodeMemberProperty: CodeTypeMember {
    public CodeTypeReference Type { get; set; }
    public bool HasGet { get; set; }
    public bool HasSet { get; set; }
    public CodeStatementCollection GetStatements { get; }
    public CodeStatementCollection SetStatements { get; }
    public CodeDeclarationCollection Parameters { get; }
    public CodeTypeReference PrivateImplementation { get; }
    public CodeTypeReferenceCollection CodeTypeReferenceCollection
        { get; }
}
```

The CodeMemberProperty class is utilized to represent a member property on a type.

Miscellaneous

The following class definitions are directed to miscellaneous types of classes that may be utilized in accordance with an aspect of the present invention.

CodeLinePragma : Object

```
            C# Sample: #line <LineNumber> "<FileName>"
    public class CodeLinePragma {
        public string FileName { get; set; }
        public int LineNumber { get; set; }
    }
}
```

The CodeLinePragma class may be used to attribute a statement or expression to originate from a line in another file.

CodeAttributeArgument : Object

```
            C# Sample: <Name> = <Value>
    public class CodeAttributeArgument {
        public string Name { get; set; }
        public CodeExpression Value { get; set; }
    }
```

CodeAttributeDeclarationCollection : Object

```
        C# Sample: [<Attributes>]
    public class CodeAttributeDeclarationCollection {
        public CodeAttributeDeclarationCollection Attributes { get; }
    }
```

CodeAttributeDeclaration : Object

```
        C# Sample: <Name>(<Arguments>)
    public class CodeAttributeDeclaration {
        public CodeAttributeArgumentCollection Arguments { get; }
        public string Name { get; set; }
    }
```

Collections

This section relates to collections that may be employed in accordance with the present invention. It is desirable if the collections support incremental parsing via a "populate contents" delegate for lazy parsing of code.

public delegate void PopulateContentsCallback(IList list);

CodeIdentifierCollection

```
public interface ICodeIdentifierCollection: ICollection {
    public bool IsValidIdentifier(string name);
    public void ValidateIdentifier(string name);
    public string CreateValidIdentifier(string name);
    public string CreateUniqueIdentifier(string baseName);
    public CodeTypeReference CreateTypeRef(string langWord);
    . . . collection interface + strongly typed "string" collection . . .
}
```

CodAttributeArgumentCollection : List

This class provides a basic collection of CodeAttributeArguments.

CodeAttributeDeclarationCollection : IList

This class provides a basic collection of CodeAttributeDeclarations.

CodeCatchClauseCollection : IList

This class provides a basic collection of CodeCatchClauses.

CodeTypeDeclarationCollection : IList

This class provides a basic collection of CodeTypeDeclarations.

CodeTypeMemberCollection : IList

This class provides a basic collection of CodeTypeMembers.

CodeExpressionCollection : IList

This class provides a basic collection of CodeExpressions.

CodeNamespaceCollection : IList

This class provides a basic collection of CodeNamespaces.

CodeNamespaceImportCollection : IList

This class provides a basic collection of CodeNamespaceImports.

CodeParameterDeclarationExpressionCollection : IList

This class provides a basic collection of CodeParameterDeclarationExpressions.

CodeStatementCollection : IList

This class provides a basic collection of CodeStatements.

Enums

This subsection provides examples of different types of Enums that may be implemented in accordance with the present invention.

CodeBinaryOperatorType : Enum

```
public enum CodeBinaryOperatorType {
    Add,
    Subtract,
    Multiply,
    Divide,
    Assign,
    IdentityInequality,
    IdentityEquality,
    ValueEquality,
    BitwiseOr,
    BitwiseAnd,
    BooleanOr,
    BooleanAnd,
    LessThan,
    LessThanOrEqual,
    GreaterThan,
    GreaterThanOrEqual,
}
```

FieldDirection : Enum

```
public enum FieldDirection
    In,
    Out,
    Ref,
}
```

MemberAttributes : Enum

```
public enum MemberAttributes
    Abstract,
    Final,
    Static,
    Override,
    New,
    Assembly,
    FamANDAssem,
    Family,
    FamORAssem,
    Private,
    Public,
    AccessMask,
    ScopeMask,
    VTableMask,
}
```

GeneratorSupport : Enum

```
public enum GeneratorSupport {
    ArraysOfArrays = 0x1,
    EntryPointMethod = 0x2,
    GotoStatments = 0x4,
    MultidimensionalArrays = 0x8,
    StaticConstructors = 0x10,
    TryCatchStatements = 0x20,
    ReturnTypeAttributes = 0x40,
}
```

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A language-neutral representation of a compile unit transformable to at least one of a plurality of different types of code representations, the language-neutral representation of the compile unit resident on one or more computers and comprising:
   a hierarchal arrangement of program elements that neutrally characterize the compile unit;
   at least one of the program elements representing a type declaration that characterizes at least one class of programmatic constructs of the compile unit; and
   a code generator that converts the language neutral representation of the compile unit to a corresponding representation of the compile unit in at least one high-level language code.

2. The language-neutral representation of claim 1, further comprising a collection of at least one member that characterizes programmatic attributes associated with and able to be implemented within the at least one class.

3. The language-neutral representation of claim 2, wherein the collection further comprises an expression class within the at least one class.

4. The language-neutral representation of claim 2, wherein the collection further comprises a statement class within the at least one class.

5. The language-neutral representation of claim 2, wherein the hierarchal arrangement further comprises a namespace that contains the at least one class.

6. The language-neutral representation of claim 1, wherein at least one of the program elements of the hierarchal arrangement encapsulates another of the program elements.

7. The language-neutral representation of claim 1 in combination with an interface associated with the language-neutral representation, the interface transforms the language-neutral representation to a corresponding desired code representation.

8. The language-neutral representation of claim 7, wherein the program elements comprise objects, each object exposing at least one of a method, attribute, and property of each respective object, the interface employs the at least one of method, attribute and property to facilitate the transformation into the desired code representation.

9. The language-neutral representation of claim 7, wherein the interface further comprises a compiler interface programmed to transform the language-neutral representation to a corresponding representation in a low-level language code.

10. The language-neutral representation of claim 9, wherein the representation in a low-level language code further comprises an assembly of computer-executable instructions.

11. The language-neutral representation of claim 7, wherein the interface further comprises a code generator interface programmed to convert the language-neutral representation to a plurality of corresponding representations, wherein each representation is in a different high-level language code.

12. The language-neutral representation of claim 1, wherein the program elements comprise instances of a plurality of language-neutral classes, each instance defining an associated object.

13. The language-neutral representation of claim 12, wherein at least one associated object represents the type declaration, at least another object being encapsulated within the at least one object representing the at least one type declaration, the at least another object representing program code of the compile unit that derives from a class associated with the at least type declaration.

14. A language-neutral representation of programmatic elements resident upon a computer-readable medium, comprising:

an instance of at least one of a plurality of language-neutral classes, the plurality of classes representing different programmatic constructs of a compile unit and having a hierarchal relationship relative to each other, whereby transformation of the instance into a different representation of the respective programmatic construct is facilitated; and a code generator that converts the instance of at least one of a plurality of language-neutral classes into a corresponding different representation of the instance in at least one high-level language code.

15. The language-neutral representation of claim 14, further comprising a plurality of instances of the plurality of the classes, wherein each instance of a corresponding class of the plurality of classes represents a respective programmatic construct of the compile unit, the plurality of instances being organized in a hierarchal relationship based on the classes associated with the plurality of instances and relationships among the programmatic constructs represented thereby.

16. The language-neutral representation of claim 15, wherein each of the plurality of instances exposes at least one item associated with the programmatic construct represented thereby.

17. The language-neutral representation of claim 16, wherein at least one of the plurality of instances represents a type declaration, at least another instance being encapsulated within the instance representing the type declaration, the at least another instance representing a programmatic construct that derives from the at least type declaration.

18. The language-neutral representation of claim 17 wherein the at least another object further comprises at least one of a statement and an expression.

19. The language-neutral representation of claim 16 in combination with an interface that transforms the language neutral representation to the different representation, the interface employs the at least one item to facilitate the transformation of the language-neutral representation into the different representation.

20. The language-neutral representation of claim 19, wherein the interface further comprises a compiler interface programmed to transform the language-neutral representation to the corresponding different representation in a low-level language code.

21. The language-neutral representation of claim 20, wherein the different representation in a low-level language code further comprises an assembly of computer-executable instructions.

22. The language-neutral representation of claim 19, wherein the interface further comprises a code generator interface programmed to generate a plurality of corresponding representations from the language-neutral representation, wherein each representation is in a different high-level language code from the language-neutral representation.

23. A language-neutral representation of computer executable instructions that are transformable to at least one other type of software code representation, the language-neutral representation existent within a computer-readable medium, comprising:

a hierarchal arrangement of objects, each object representing a different program element of the compile unit;

at least one class object that represents at least one defined class of program elements of the compile unit;

at least one member object associated with the at least one class object that represents computer-executable instructions operable on at least some program elements in the at least one defined class; and a code generator that converts the language-neutral representation of computer executable instructions into a corresponding representation in at least one high-level language code.

24. The language-neutral representation of claim 23, further comprising a namespace object that represents a namespace of the compile unit, the namespace object comprising a collection of class objects including the at least one class object.

25. The language-neutral representation of claim 24, further comprising a plurality of member objects associated with the at least one class object, wherein the at least one class object represents a common base class that is shared by the plurality of member objects.

26. The language-neutral representation of claim 24, wherein the plurality of member objects further comprise a collection of objects representing at least one of a statement and an expression of the compile unit.

27. The language-neutral representation of claim 23 in combination with an associated interface, the interface transforms the language-neutral representation to a corresponding desired code representation.

28. The language-neutral representation of claim 27, wherein each object exposes at least one item indicative of the program element represented thereby, the interface employs each exposed item to facilitate transformation of the language-neutral representation into the desired code representation.

29. The language-neutral representation of claim 28, wherein the interface further comprises a compiler interface that exposes computer-executable instructions to transform the language-neutral representation to a corresponding representation in a low-level language code.

30. The language-neutral representation of claim 29, wherein the representation in a low-level language code further comprises an assembly of computer-executable instructions.

31. The language-neutral representation of claim 28, wherein the interface further comprises a code generator interface that exposes computer-executable instructions to convert the language-neutral representation to a plurality of corresponding representations, wherein each representation is in a different high-level language code.

32. A language-neutral representation of programmatic elements within a computer-readable medium, comprising:

means for representing different code portions of a compile unit in a language-neutral manner, the means for representing being arranged according to a hierarchy;

means for converting the language neutral representation of the compile unit into a representation of the compile unit in a low level language code; and means for converting the language neutral representation of the compile unit into a representation of the compile unit in a high level language code.

33. The language-neutral representation of claim 32, further comprising means for transforming the language-neutral representation to a plurality of corresponding desired representations of code.

34. The combination of claim 33, wherein the means for transforming further comprises means for compiling the language-neutral representation to a plurality of corresponding representations, wherein each representation is in a different low-level language code representation.

35. The language-neutral representation of claim 33, wherein the means for transforming further comprises means for generating a plurality of corresponding representations from the language-neutral representation, wherein each representation is in a different high-level language code.

36. A computer implemented system that comprises one or more processors to transforms a language-specific representation of a compile unit to a language-neutral representation thereof, the system comprising the following computer executable components:
 a plurality of language-neutral classes that represent different programmatic constructs and have a hierarchal relationship relative to each other;
 an interface that exposes the plurality of classes;
 a design system that employs the interface to instantiate selected classes of the plurality of classes to create corresponding objects that represent respective code elements of the compile unit arranged according to the hierarchal relationship to define the language-neutral representation; and
 a code generator that converts the language-neutral representation of the compile unit into a corresponding representation in at least one high-level language code.

37. The system of claim 36, wherein at least one of the objects is a namespace object that comprises a collection of at least one base class member object that provides a common base class for at least some of the objects.

38. The system of claim 37, wherein the at least one base class further comprises at least one member comprising a collection of objects representing at least one of a statement and an expression of the compile unit.

39. The system of claim 36, wherein the code generator interface is programmed to transform the language-neutral representation to a high-level language code that is different from the language-specific representation.

40. A computer-readable medium having stored thereon computer-executable instructions for creating a language-neutral representation of a compile unit, comprising:
 a language-neutral representation comprising associated objects that represent different parts of the compile unit arranged according to an established hierarchy, each of the objects being an instance of a respective class of a plurality of language-neutral classes, each respective class defining a different part of code according to the established hierarchy; and
 a code generator that converts the language-neutral representation of the compile unit into a corresponding representation in at least one high-level language code.

41. A method to transform a representation of a compile unit in a first high level language code to a language-neutral representation thereof, the method comprising:
 mapping each of a plurality of programmatic constructs of the first high level language code to a corresponding class of a plurality of language-neutral classes, the classes having a hierarchal relationship relative to each other;
 instantiating each corresponding class based on the mapping to create corresponding objects that represent respective programmatic constructs of the compile unit;
 arranging the objects according to the hierarchal relationship to define the language neutral representation; and
 converting the language-neutral representation of the compile unit into a corresponding representation in at least one second high-level language code, the second high level language code is in a different high level language than the first high level language code.

42. The method of claim 41, further comprising transforming the language-neutral representation into a corresponding representation of the compile unit in a high-level language code that is the same as the representation of the compile unit in the first high level language code.

43. A computer implemented system that comprises one or more processors to transform a language-neutral representation of a compile unit to a high-level language, comprising the following computer executable components:
 an interface that controls manipulation of a plurality of language-neutral program elements of the compile unit, each of the plurality of program elements being an instance of a corresponding class of a plurality of classes arranged according to a hierarchy; and
 a code generator that implements the interface to transform each of the program elements to a representation in a high-level language code thereof corresponding to program information associated with each respective program element.

44. The system of claim 43, wherein the interface further comprises a class interface to expose program information relating to a base class of the compile unit representing at least one type declaration.

45. The system of claim 44, wherein the interface further comprises a member interface that exposes program information relating to a member of the base class of the compile unit.

46. The system of claim 43, wherein the member of the base class represents a base class for at least one of a statement and an expression.

47. A method to transform a language-neutral representation of a compile unit to a corresponding target language-based representation, the method comprising:
 providing an interface to expose at least one method operative to control manipulation of at least one program element and compilation of the language neutral representation, the language-neutral representation including at least one language-neutral program element, the at least one language-neutral program element being an instance of a corresponding class of a plurality of classes arranged according to a hierarchy; and
 depending on the target language-based representation, converting the at least one program element to a representation in a high-level language code thereof according to the at least one exposed method or implementing the interface relative to the language neutral representation to compile each instance of the language-neutral representation into a representation in a low-level language code.

48. A computer implemented system that comprises one or more processors to translate a language-neutral representation of a compile unit to a low-level language, comprising the following computer executable components:

an interface that exposes methods to control compilation of the language-neutral representation;

a compiler that implements the interface to translate a plurality of program elements that define the language-neutral representation into the low-level language code, each of the plurality of program elements being an instance of a corresponding class of a plurality of classes that represent program constructs, the plurality of elements being arranged according to a hierarchy; and a code generator that converts the plurality of program elements that define the language-neutral representation of the compile unit into a corresponding representation in at least one high-level language code.

49. The system of claim 48, wherein the low-level language code comprises at least one of an assembly, byte code and intermediate language.

* * * * *